United States Patent
Ota et al.

(10) Patent No.: US 12,421,027 B2
(45) Date of Patent: Sep. 23, 2025

(54) DELIVERY SHELF SYSTEM AND ITS CONTROL METHOD

(71) Applicant: TOYOTA JIDOSHA KABUSHIKI KAISHA, Toyota (JP)

(72) Inventors: Junya Ota, Tokyo-to (JP); Kunihiro Iwamoto, Ichikawa (JP); Yuta Itozawa, Tokyo-to (JP); Hirotaka Komura, Tokyo-to (JP); Takatoshi Morimitsu, Toyota (JP); Yutaro Takagi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 18/302,073

(22) Filed: Apr. 18, 2023

(65) Prior Publication Data

US 2023/0365330 A1 Nov. 16, 2023

(30) Foreign Application Priority Data

May 16, 2022 (JP) ................................ 2022-080201

(51) Int. Cl.
*B65G 1/02* (2006.01)
*B65G 1/04* (2006.01)
(Continued)

(52) U.S. Cl.
CPC ............. *B65G 1/026* (2013.01); *B65G 1/023* (2013.01); *B65G 1/0457* (2013.01); *B65G 1/08* (2013.01);
(Continued)

(58) Field of Classification Search
CPC .......... B65G 1/023; B65G 1/026; B65G 1/08; B65G 1/0457; B65G 47/8815;
(Continued)

(56) References Cited

U.S. PATENT DOCUMENTS 6,415,552 B1 * 7/2002 Khosropour ............ F25D 23/12
52/27
11,478,099 B1 * 10/2022 Bates ................... A47G 29/141
(Continued)

FOREIGN PATENT DOCUMENTS

| JP | 02-310852 A | 12/1990 |
| JP | 10-077109 A | 3/1998 |
| JP | 2005-200191 A | 7/2005 |

*Primary Examiner* — Glenn F Myers
(74) *Attorney, Agent, or Firm* — Sughrue Mion, PLLC

(57) ABSTRACT

A delivery shelf system includes a shelf extending from an exterior to an interior of a building, and a returnable box (RB) stored and slidably supported in the shelf. A first recessed part (FRP) is provided in an indoor-side end part of RB and a second recessed part (SRP) is provided in an outdoor-side end part thereof; a locking mechanism including a projecting part configured to be pressed and inserted into FRP or into SRP is provided at the indoor-side end part of the shelf; the projecting part is inserted into FRP while RB is stored in the shelf, so that RB is locked to the shelf; and when the projecting part is retracted from FRP by releasing the locking and RB is pulled out from the shelf into inside the building, the projecting part is inserted into SRP and the pulled-out RB is thereby stopped.

8 Claims, 18 Drawing Sheets

(51) Int. Cl.
*B65G 1/08* (2006.01)
*E05B 47/00* (2006.01)

(52) U.S. Cl.
CPC .... *B65G 2201/025* (2013.01); *E05B 47/0001* (2013.01)

(58) Field of Classification Search
CPC ........ B65G 2201/025; A47G 2029/142; A47G 2029/145; A47G 2029/147; A47G 2029/149; A47G 29/141; A47G 29/28; A47G 29/20; E05B 47/0001; A47B 88/57; A47B 88/50; A47B 88/00; A47B 88/403; A47B 77/16; A47B 67/02; A47B 83/00; F25D 23/10; F25D 25/025
See application file for complete search history.

(56) References Cited

U.S. PATENT DOCUMENTS

2019/0261802 A1\* 8/2019 Vernal .................... A47G 29/20
2023/0329435 A1\* 10/2023 Lundeen ................ A47B 31/00

\* cited by examiner

DELIVERY SHELF SYSTEM AND ITS CONTROL METHOD

CROSS REFERENCE TO RELATED APPLICATIONS

This application is based upon and claims the benefit of priority from Japanese patent application No. 2022-080201, filed on May 16, 2022, the disclosure of which is incorporated herein in its entirety by reference.

BACKGROUND

The present disclosure relates to a delivery shelf system and its control method.

Japanese Unexamined Patent Application Publication No. H10-077109 discloses a container and a shelf, in which the container includes a pair of magnetic elements at both ends thereof in a direction in which the container is put in and taken out from the shelf, and the shelf includes electromagnets that stick to the magnetic elements of the container. In Japanese Unexamined Patent Application Publication No. H10-077109, the electromagnets are activated so that they stuck to and hold the container when shaking such as that caused by an earthquake is detected by an accelerometer.

SUMMARY

The inventors are studying a delivery shelf system in which upon the returnable box being delivered, it can be pushed from outside a building into a shelf extending from the exterior of the building to the interior thereof, and the returnable box stored in the shelf can be pulled out from the shelf from inside the building.

In the case where the technique disclosed in Japanese Unexamined Patent Application Publication No. H10-077109 is applied to the above-described delivery shelf system, because the electromagnets are activated only when shaking is detected in Japanese Unexamined Patent Application Publication No. H10-077109, it is impossible to lock (i.e., fix) the returnable box while the returnable box is stored in the shelf. Further, in the configuration disclosed in Japanese Unexamined Patent Application Publication No. H10-077109, there is a possibility that when the returnable box is pulled from the shelf, the returnable box may fall off from the shelf due to its excessive momentum.

The present disclosure has been made in view of the above-described circumstances, and an object thereof is to provide a delivery shelf system capable of locking a returnable box to a shelf while the returnable box is stored in the shelf, and preventing the returnable box from falling off from the shelf when the returnable box is pulled out from the shelf.

A delivery shelf system according to an aspect of the present disclosure includes:
  a shelf provided so as to extend from an exterior of a building to an interior thereof; and
  a returnable box configured to be stored and slidably supported in the shelf, in which
  upon the returnable box being delivered, it can be pushed from outside the building into the shelf, and the returnable box stored in the shelf can be pulled out from the shelf from inside the building, and in which
  a first recessed part is provided in an indoor-side end part of the returnable box and a second recessed part is provided in an outdoor-side end part thereof, the indoor-side end part being an end part of the returnable box that is positioned on an indoor side when the returnable box is stored in the shelf,
  a locking mechanism including a projecting part is provided at the indoor-side end part of the shelf, the projecting part being configured to be pressed and inserted into the first recessed part or into the second recessed part,
  the projecting part is inserted into the first recessed part while the returnable box is stored in the shelf, so that the returnable box is locked to the shelf, and
  when the projecting part is retracted from the first recessed part by releasing the locking and the returnable box is pulled out from the shelf into inside the building, the projecting part is inserted into the second recessed part and the pulled-out returnable box is thereby stopped.

Further, another aspect of the present disclosure is a method for controlling a delivery shelf system,
  the delivery shelf system including:
  a shelf provided so as to extend from an exterior of a building to an interior thereof; and
  a returnable box configured to be stored and slidably supported in the shelf, in which
  upon the returnable box being delivered, it can be pushed from outside the building into the shelf, and the returnable box stored in the shelf can be pulled out from the shelf from inside the building, and in which
  a first recessed part is provided in an indoor-side end part of the returnable box and a second recessed part is provided in an outdoor-side end part thereof, the indoor-side end part being an end part of the returnable box that is positioned on an indoor side when the returnable box is stored in the shelf, and the outdoor-side end part being an end part of the returnable box that is positioned on an outdoor side when the returnable box is stored in the shelf,
  a locking mechanism including a projecting part is provided at the indoor-side end part of the shelf, the projecting part being configured to be pressed and inserted into the first recessed part or into the second recessed part,
  the projecting part is inserted into the first recessed part while the returnable box is stored in the shelf, so that the returnable box is locked to the shelf, and
  when the projecting part is retracted from the first recessed part by releasing the locking and the returnable box is pulled out from the shelf into inside the building, the projecting part is inserted into the second recessed part and the pulled-out returnable box is thereby stopped.

In an aspect of the present disclosure, the first recessed part is provided in the indoor-side end part of the returnable box, which is an end of the returnable box that is positioned on the indoor side of the building when the returnable box is stored in the shelf, and the second recessed part is provided in the outdoor-side end part thereof, which is an end of the returnable box that is positioned on the outdoor side of the building when the returnable box is stored in the shelf. Further, the locking mechanism including a projecting part, which is configured to be pressed and inserted into the first recessed part or into the second recessed part, is provided at the indoor-side end part of the shelf. Further, the projecting part is inserted into the first recessed part while the returnable box is stored in the shelf, so that the returnable box is locked to the shelf, and when the projecting part is retracted from the first recessed part by releasing the locking and the returnable box is pulled out from the shelf into inside the building, the projecting part is inserted into the second recessed part and the pulled-out returnable box is thereby stopped. Therefore, it is possible to lock the returnable box to the shelf while the returnable box is stored in the shelf, and to prevent the returnable box from falling off from the shelf when the returnable box is pulled out from the shelf.

The second recessed part may be inclined so that an opening thereof becomes larger toward an indoor side, and when the pulled-out returnable box is pushed back from inside the building into the shelf, the second recessed part may pass through the projecting part without unlocking the returnable box. By the above-described configuration, when the pulled-out returnable box is pushed back from inside the building into the shelf, the second recessed part can pass through the projecting part without unlocking the returnable box.

The delivery shelf system apparatus may further include a sensor configured to detect a movement of the returnable box from a storage position of the returnable box in the shelf toward an indoor side. Further, after unlocking the returnable box, when the sensor has detected the movement of the returnable box, a state of the returnable box may be changed from an unlocked state to a locked state. By the above-described configuration, the projecting part is retracted from the first recessed part by releasing the locking, and when the returnable box is pulled out from the shelf into inside the building, the state of the returnable box may be automatically changed from the locked state to the unlocked state. Therefore, it is possible to automatically insert the projecting part into the second recessed part when the returnable box is pulled out from the shelf, and thereby to prevent the returnable box from falling off from the shelf.

The locking mechanism may be a solenoid lock configured to retract the projecting part and thereby unlock the returnable box in an energized state. Since the locked state is a deenergized state, the electric power consumed by the locking mechanism can be reduced.

A roller may be provided at a tip of the projecting part. By the roller, the friction coefficient between the returnable box and the locking mechanism can be reduced, and the generation of wear particles can be prevented.

The shelf may include a housing and a pair of support members extending in a depth direction inside the housing, and the returnable box may include protrusion parts protruding outward in a width direction and configured to slide on the pair of support members. Further, the first and second recessed parts may be disposed in one of upper and lower surfaces of the projecting part, and the one of the upper and lower surfaces and the projecting part of the locking mechanism may slide on each other.

At both ends of each of the protrusion parts in a sliding direction, one of the upper and lower surfaces thereof may be inclined from a horizontal surface so as to get closer to the other of the upper and lower surfaces thereof, and a thickness of each of the protrusion parts may be reduced toward both ends of that protrusion part in the sliding direction. By the above-described configuration, both ends of each of the protrusion parts in the sliding direction are less likely to get caught in the locking mechanism, and a pressing force of the locking mechanism can be gradually increased.

According to the present disclosure, it is possible to provide a delivery shelf system capable of locking a returnable box to a shelf while the returnable box is stored in the shelf, and preventing the returnable box from falling off from the shelf when the returnable box is pulled out from the shelf.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
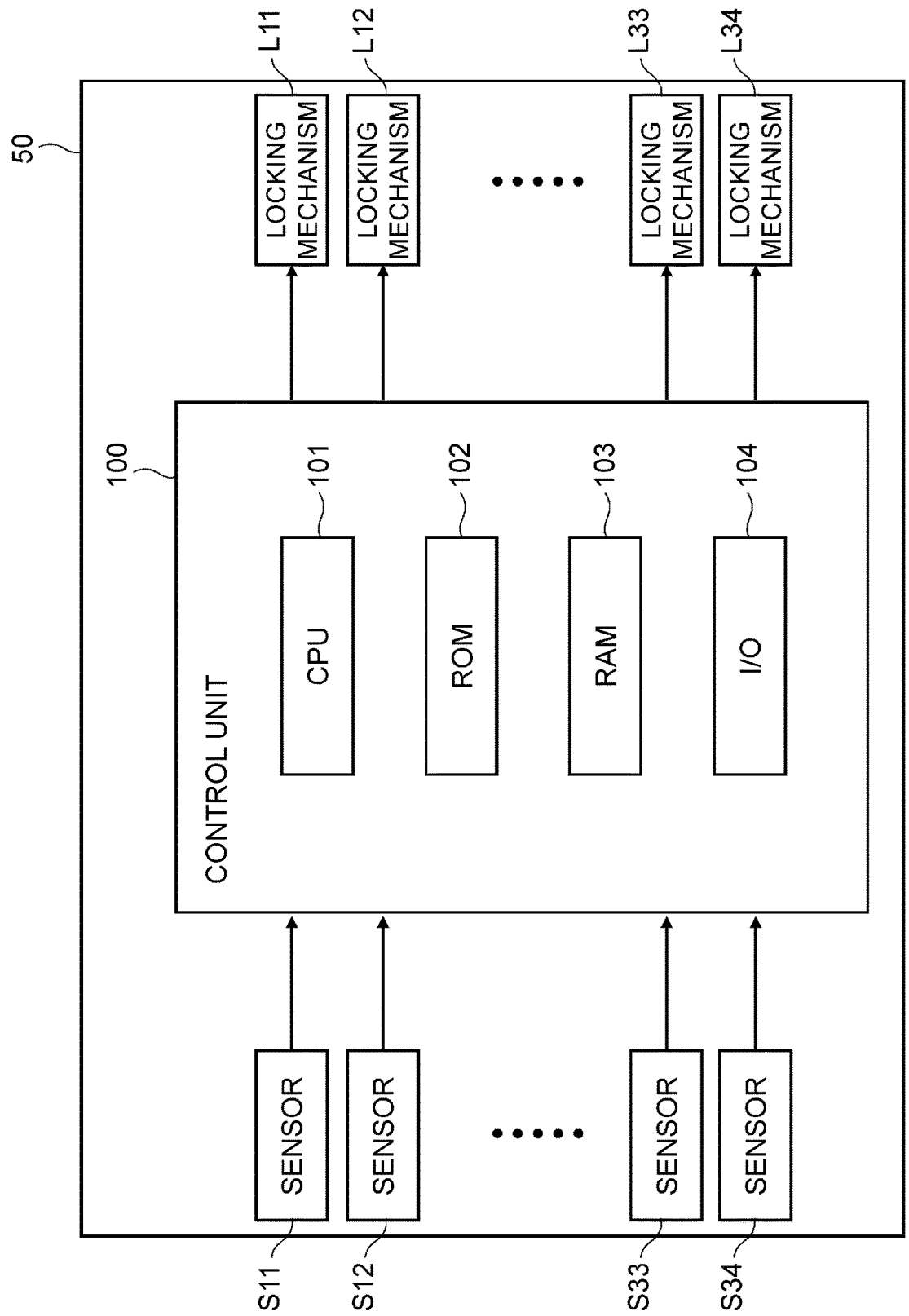
FIG. 1 is a block diagram of a delivery shelf system according to a first embodiment.

Specific embodiments will be described hereinafter in detail with reference to the drawings. The same or corresponding elements are denoted by the same reference numerals or symbols throughout the drawings, and redundant descriptions thereof are omitted as appropriate for clarifying the descriptions.

First Embodiment

<Configuration of Delivery Shelf System>

Firstly, a delivery shelf system according to a first embodiment will be described with reference to FIG. 1. FIG. 1 is a block diagram of the delivery shelf system according to the first embodiment.

As shown in FIG. 1, the delivery shelf system according to this embodiment includes a shelf 50 and a control unit 100. The delivery shelf system is a system in which putting in and taking out of a returnable box to be stored in the shelf 50 is controlled by using the control unit 100, which may be a computer.

Figure 2:
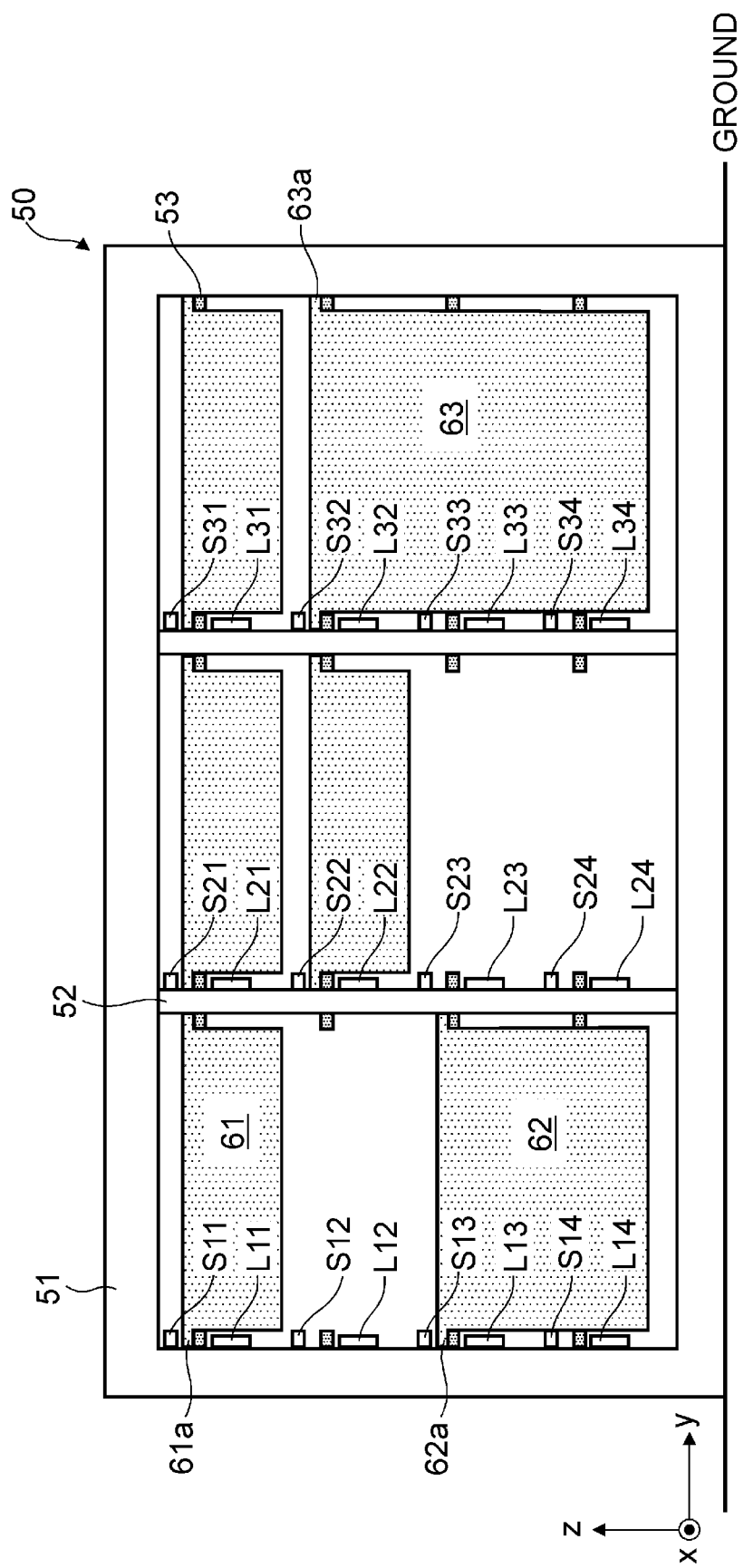
FIG. 2 is a schematic front view showing an example of a configuration of a shelf 50 used in the delivery shelf system according to the first embodiment.

Note that FIG. 2 is a schematic front view showing an example of a configuration of the shelf 50 used in the delivery shelf system according to the first embodiment.

As shown in FIG. 2, the shelf 50 includes a housing 51 and a plurality of pairs of rails 53 that extend in the depth direction (the x-axis direction) and are equally spaced in the height direction (the z-axis direction) inside the housing 51.

That is, in the shelf 50, returnable boxes 61, 62, and 63 having a plurality of predefined sizes are stored and slidably supported by respective pairs of rails 53. More specifically, as shown in FIG. 2, protrusion parts 61a, 62a, and 63a protruding outward in the width direction from the respective returnable boxes 61 to 63 slide on respective pairs of adjacent and opposing rails 53, so that the returnable boxes 61 to 63 can be put in or taken out from the shelf 50.

Note that right-handed xyz-orthogonal coordinate systems shown in FIG. 2 and other drawings are shown just for facilitating the explaining of positional relationships among components. In general, throughout the drawings, the z-axis positive direction is the vertically upward direction, and the xy-plane is the horizontal plane. Further, FIG. 2 is a front view, and the rails 53 and the returnable boxes 61 to 63 are shown in dotted patterns for facilitating the understanding thereof.

As will be described later in detail, the shelf 50 is provided (e.g., built) so as to extend from the exterior of a building to the interior thereof. Therefore, the returnable boxes 61 to 63 in which commodities or the like are stored can be put in the shelf 50 from outside the building, and the returnable boxes 61 to 63 stored in the shelf 50 can be pulled out into inside the building and the commodities or the like can be taken out from the returnable boxes 61 to 63.

Each of the returnable boxes is made of, for example, but is not limited to, plastic, cardboard, wood, metal, or the like, and is repeatedly used.

Further, the shelf 50 shown in FIG. 2 includes 12 storage spaces in each of which a returnable box 61 having the smallest size can be stored. Therefore, the shelf 50 includes 12 sensors S11 to S14, S21 to S24, and S31 to S34, and 12 locking mechanisms L11 to L14, L21 to L24, and L31 to L34 corresponding to the respective storage spaces.

Note that there may be unused storage spaces as shown in FIG. 2, or all the storage spaces may be used. Further, needless to say, the number of storage spaces in the shelf 50 shown in FIG. 2 is merely an example, and the number of storage spaces can be determined as desired.

The sensor S11 is used to control the locking mechanism L11. Similarly, the sensor S12 is used to control the locking mechanism L12. The same applies to the other sensors. That is, the sensors S11 to S14, S21 to S24, and S31 to S34 correspond to the locking mechanisms L11 to L14, L21 to L24, and L31 to L34 in a one-to-one manner.

As shown in FIG. 1, the control unit 100 is connected to the sensors S11 to S14, S21 to S24, and S31 to S34 and to the locking mechanisms L11 to L14, L21 to L24, and L31 to L34, both of which are provided in the shelf 50, wirelessly or through cables so that the control unit 100 can communicate with them.

Note that although the control unit 100 is provided inside the shelf 50 in FIG. 1, the control unit 100 may be provided outside the shelf 50.

The control unit 100 controls the locking mechanism L11 based on an unlocking instruction from an operator who is operating the shelf 50 or a signal from the sensor S11. Similarly, the control unit 100 controls the locking mechanism L12 based on an unlocking instruction from the operator or a signal from the sensor S12. The same applies to the other locking mechanism. Note that the operator is, for example, a person or a robot (e.g., a delivery person) who delivers a returnable box storing a commodity or the like therein and puts the returnable box in the shelf 50, or a person or a robot (e.g., a recipient) who takes out and receives the commodity or the like from the returnable box stored in the shelf 50.

Details of the control of the locking mechanisms L11 to L14, L21 to L24, and L31 to L34 performed by the control unit 100 will be described later.

As shown in FIG. 1, the control unit 100 includes, as hardware, a CPU (Central Processing Unit) 101, a ROM (Read Only Memory) 102, a RAM (Random Access Memory) 103, and an I/O (Input/Output) 104. That is, the control unit 100 have functions as a computer and performs various processes based on various programs or the like.

The CPU 101 is, for example, an arithmetic unit that performs control processing, arithmetic processing, and the like.

The ROM 102 is, for example, a storage unit that stores a control program, an arithmetic program, and the like to be executed by the CPU 101.

The RAM 103 is a storage unit that temporarily stores processing data and the like.

The I/O 104 is an input/output device that receives data and signals from the outside and outputs data and signals to the outside.

<Configuration of Shelf 50>

Next, details of the configuration of the shelf 50 will be described with reference to FIGS. 3 to 5 as well as FIG. 2.

Figure 3:
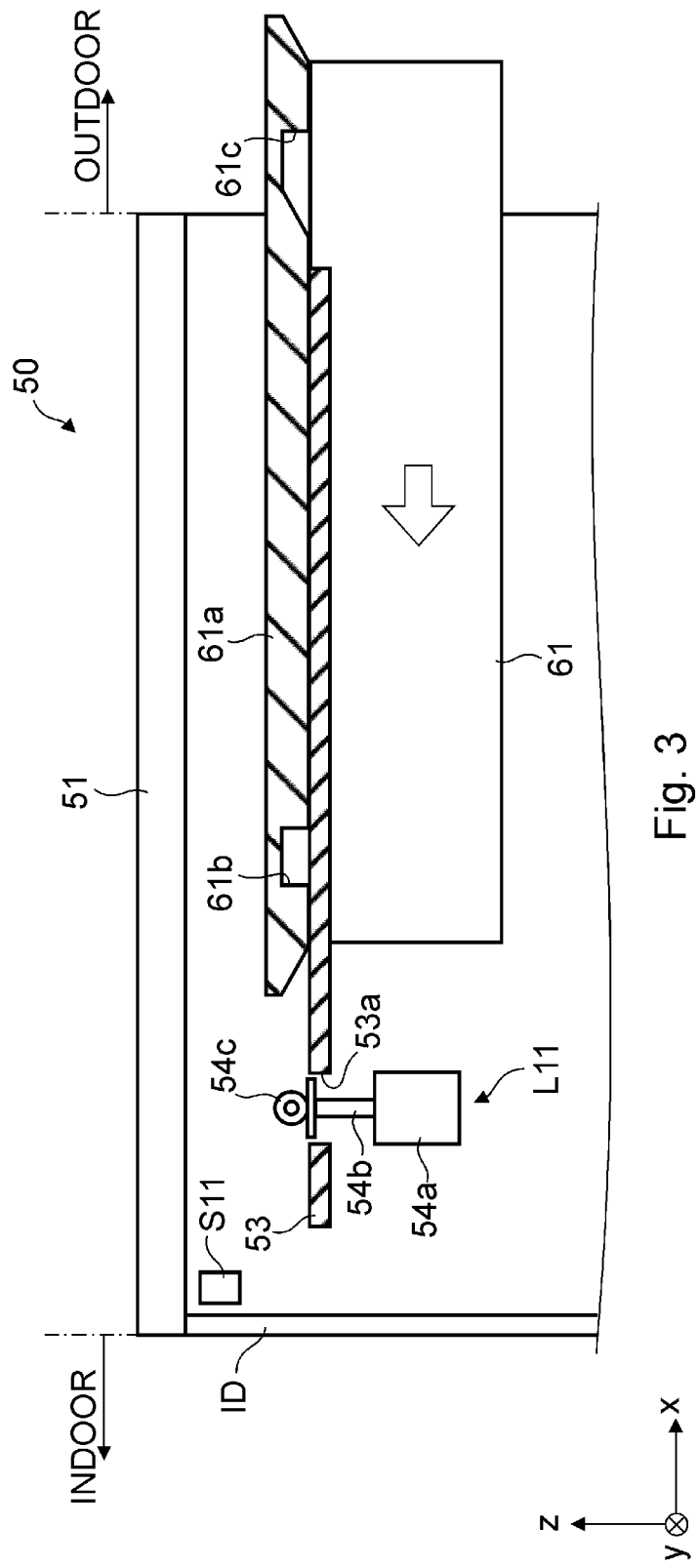
FIG. 3 is a schematic side view showing a state in which a returnable box 61 is put from outside a building into a storage space including a sensor S11 and a locking mechanism L11 in FIG. 2.
Figure 4:
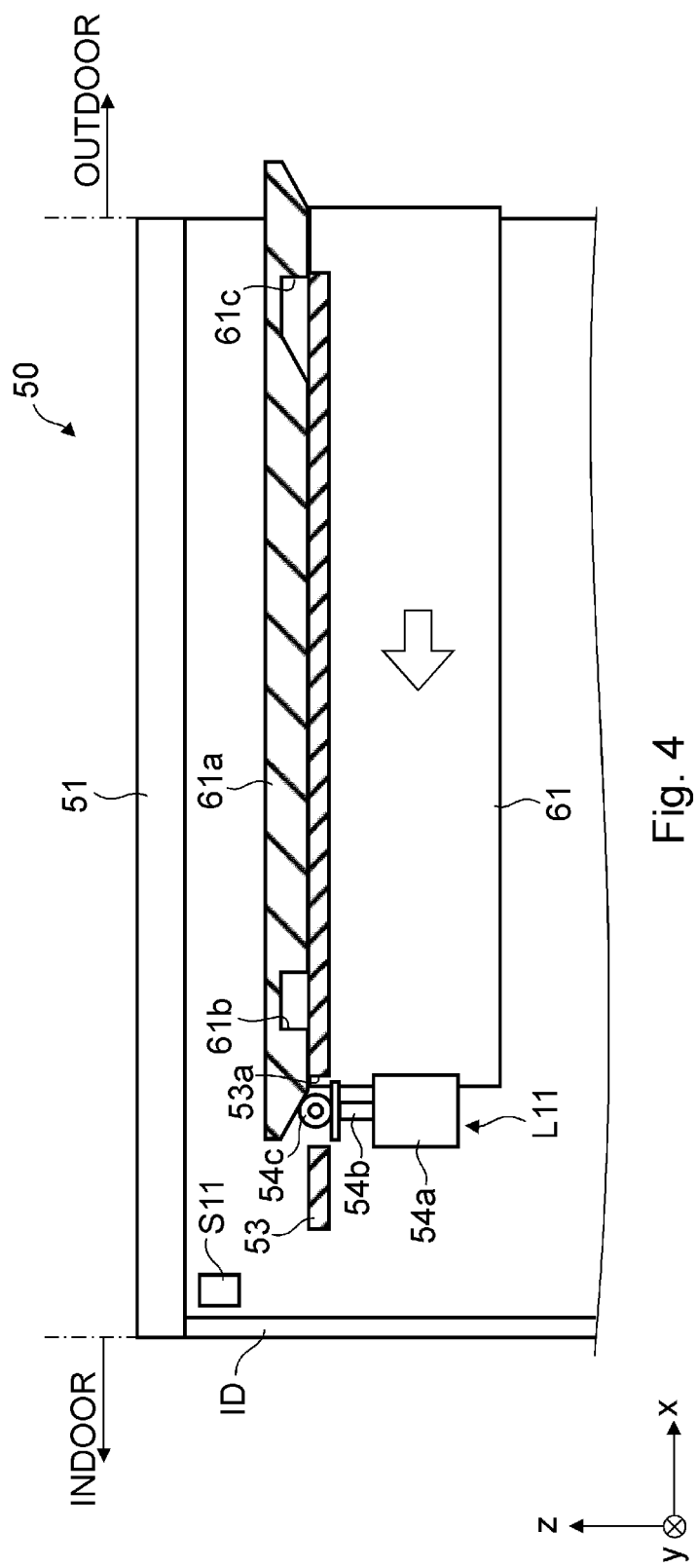
FIG. 4 is a schematic side view showing a state in which the returnable box 61 is put from outside the building into the storage space equipped with the sensor S11 and the locking mechanism L11 in FIG. 2.
Figure 5:
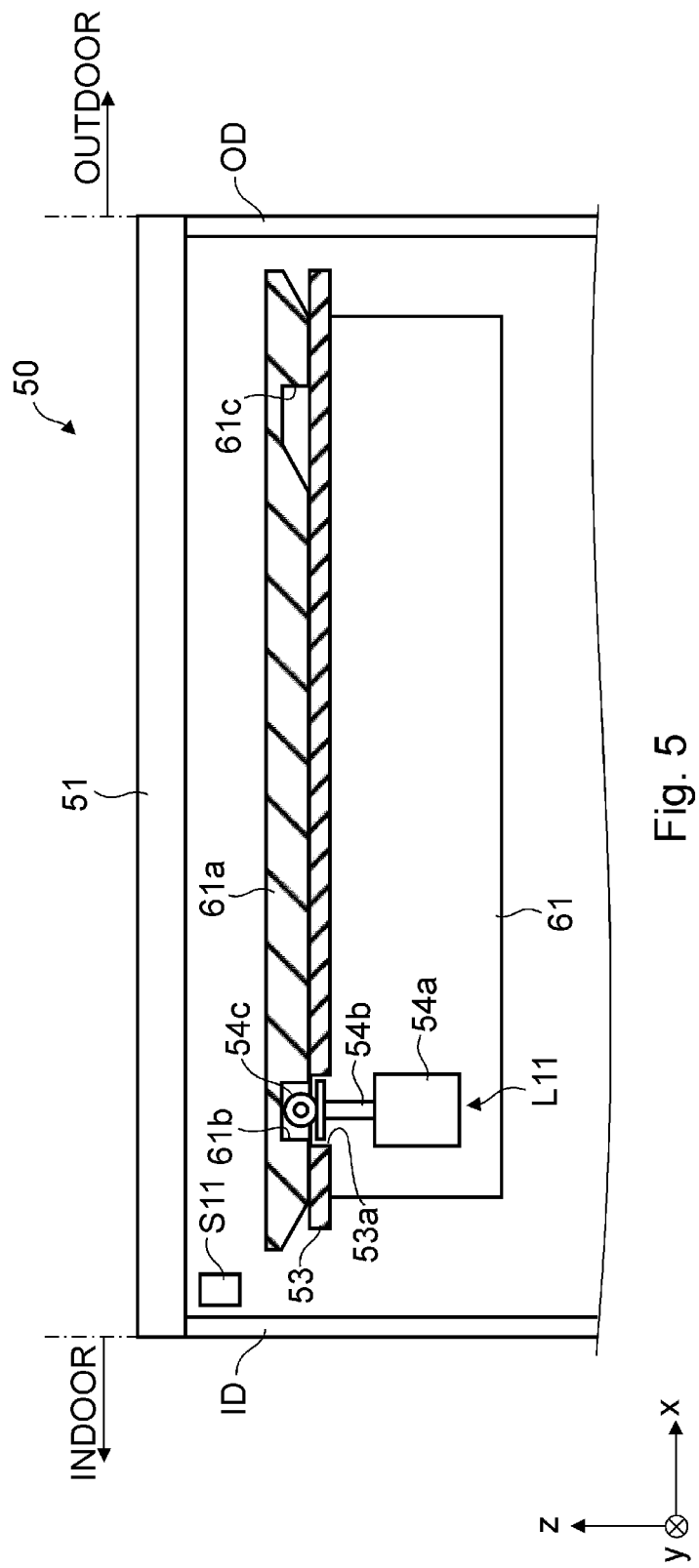
FIG. 5 is a schematic side view showing a state in which the returnable box 61 is put from outside the building into the storage space equipped with the sensor S11 and the locking mechanism L11 in FIG. 2.

FIGS. 3 to 5 are schematic side views showing states in which the returnable box 61 is put from outside the building into the storage space in which the sensor S11 and the locking mechanism L11 are provided in FIG. 2.

Note that although FIGS. 3 to 5 are side views, the rail 53 (i.e., one of the rails 53) of the shelf 50 and the protrusion part 61a (i.e., one of the protrusion parts 61a) of the returnable box 61 are shown in cross section for facilitating the understanding.

As shown in FIGS. 3 to 5, the shelf 50 is a home-delivery locker extending from the exterior of a house to the interior thereof. Therefore, for example, a delivery person (including a delivery robot) can put delivered returnable boxes 61 to 63 from outside the house into the shelf 50, and a recipient (including an indoor robot) can pull out the returnable boxes 61 to 63 from the shelf 50 into inside the house and take out the commodities or the like from the returnable boxes 61 to 63.

Note that, in this specification, the house includes an apartment building, an office building, and the like. Further, the outdoor also include inside the building as long as a delivery person (including a delivery robot) can access there. For example, the outdoor includes a shared area of the building such as a hallway in an apartment building.

As shown in FIG. 2, the shelf 50 includes a housing 51, dividing plates 52, rails 53, sensors S11 to S14, S21 to S24, and S31 to S34, and locking mechanisms L11 to L14, L21 to L24, and L31 to L34.

As shown in FIG. 2, the housing 51 constitutes the outer frame of the shelf 50. In the example shown in FIG. 2, the housing 51 has a frame structure in which a top plate provided on the positive side in the z-axis direction, a bottom plate provided on the negative side in the z-axis direction, and side plates provided on the positive and negative sides in the y-axis direction are integrally formed. That is, the front and rear of the housing 51 are opened so that returnable boxes 61 to 63 can be put in or taken out from the housing. Note that, for the sake of convenience, the front of the housing 51 is defined as the outdoor side (the positive side in the x-axis direction) and the rear of the housing 51 is defined as the indoor side (the negative side in the x-axis direction).

As shown in FIG. 5, an inner door ID for separating inside the house from inside the shelf 50 is provided on the rear of the housing 51. Meanwhile, an outer door OD for separating outside the house of the like from inside the shelf 50 is provided on the front of the housing 51. Note that in order to protect the privacy of occupants of the house, an interlocking mechanism may be provided to prevent the inner door ID and the outer door OD from being opened at the same time.

Note that, in FIG. 2, illustration of the inner door ID and the outer door OD is omitted.

As shown in FIG. 2, the dividing plates 52 are arranged parallel to the side plates constituting the sides of the housing 51 (i.e., parallel to the xz-plane), and are disposed so as to extend from the front of the housing 51 to the rear thereof, both of which are opened.

Note that the dividing plates 52 are arranged so that the distances between the side plates of the housing 51 and the adjacent dividing plates 52 and the distances between adjacent dividing plates 52 are equal to each other.

In the example shown in FIG. 2, two dividing plate 52 are provided, and therefore three rows of storage spaces for returnable boxes 61 to 63 are provided. Therefore, each of the inner door ID and the outer door OD shown in FIG. 5 is composed of, for example, three doors which correspond to the respective rows and can be slid in the y-axis direction. By the above-described configuration, in the shelf 50, it is possible to open only one row including storage spaces, to/from which returnable boxes 61 to 63 are put in and taken out, while leaving the other rows closed.

Note that the number of dividing plates 52 is not limited to any particular number. Further, no dividing plate 52 may be provided and returnable boxes 61 to 63 may be stored in a single row.

As shown in FIG. 2, a plurality of pairs of rails (support members) 53 extend in the depth direction (the x-axis direction) and are equally spaced in the height direction (the z-axis direction) on the inner surfaces of the housing 51 and on the dividing plates 52. Note that the rails 53 are disposed so as to rise roughly vertically from the inner surfaces of the housing 51 and from the dividing plates 52. In the example shown in FIG. 2, four pairs of rails 53 are provided in each of the rows, and four returnable boxes 61 each having the smallest size can be stored in each of the rows.

Note that, needless to say, the number of rails 53 is not limited to any particular number. Alternatively, each of the rails 53 may extend in a discontinuous manner in the depth direction (in the x-axis direction) as long as they can support returnable boxes 61 to 63. Alternatively, support members each having a short length, instead of the rails 53, may be arranged in an orderly manner in the depth direction (the x-axis direction).

As shown in FIG. 2, the protrusion parts 61a to 63a protruding outward in the width direction from the respective returnable boxes 61 to 63 slide on respective pairs of adjacent and opposing rails 53, so that the returnable boxes 61 to 63 can be put in or taken out from the shelf.

As described above, in the shelf 50, returnable boxes 61 to 63 having a plurality of pre-defined sizes can be stored and slidably supported by respective pairs of rails 53.

As shown in FIG. 2, the locking mechanisms L11 to L14, L21 to L24, and L31 to L34 are provided on the underside of the respective pairs of rails 53. By the locking mechanisms L11 to L14, L21 to L24, and L31 to L34, it is possible to lock the returnable boxes 61 to 63 stored in the shelf 50 and their lids (not shown) to the housing 51, and thereby to prevent the returnable boxes 61 to 63 and commodities or the like stored inside them from being stolen.

Note that details of the rail 53 and the locking mechanism L11 will be described later.

In this embodiment, all the returnable boxes 61 to 63 having a plurality of pre-defined sizes have the same width in the y-axis direction and the same depth in the x-axis direction. Meanwhile, the returnable boxes 61 to 63 have different heights in the z-axis direction. The height of the returnable box 61 having the smallest size is designed in accordance with the distance between adjacent rails 53 in the z-axis direction. Needless to say, the height of the returnable box 61 having the smallest size is shorter than the distance between the adjacent rails 53. The height of the returnable box 62 having an intermediate size is designed to about twice the height of the returnable box 61. Further, the height of the returnable box 63 having the largest size is designed to about three times the height of the returnable box 61.

That is, the height of each of the returnable boxes 61 to 63 having a plurality of pre-defined sizes is designed to a length roughly equal to an integral multiple of the distance between adjacent rails 53 in the z-axis direction.

Note that, in the example shown in FIG. 2, there are three sizes of returnable boxes, but the number of sizes may be two, or may be four or more. In the example shown in FIG. 2, in addition to the returnable boxes 61 to 63, another returnable box(es) having, for example, a height about four times the height of the returnable box 61 may be provided.

Further, in the shelf 50 shown in FIG. 2, 12 sensors S11 to S14, S21 to S24, and S31 to S34 each of which detects an object (i.e., one of the returnable boxes 61 to 63) are provided for respective pairs of rails 53 each of which is composed of two rails adjacent to each other in the vertical direction.

The sensors S11 to S14, S21 to S24, and S31 to S34 are, for example, reflective or transmissive optical sensors or non-contact-type sensors such as proximity sensors. Alternatively, the sensors S11 to S14, S21 to S24, and S31 to S34 may be contact-type sensors such as limit switches.

Figure 8:
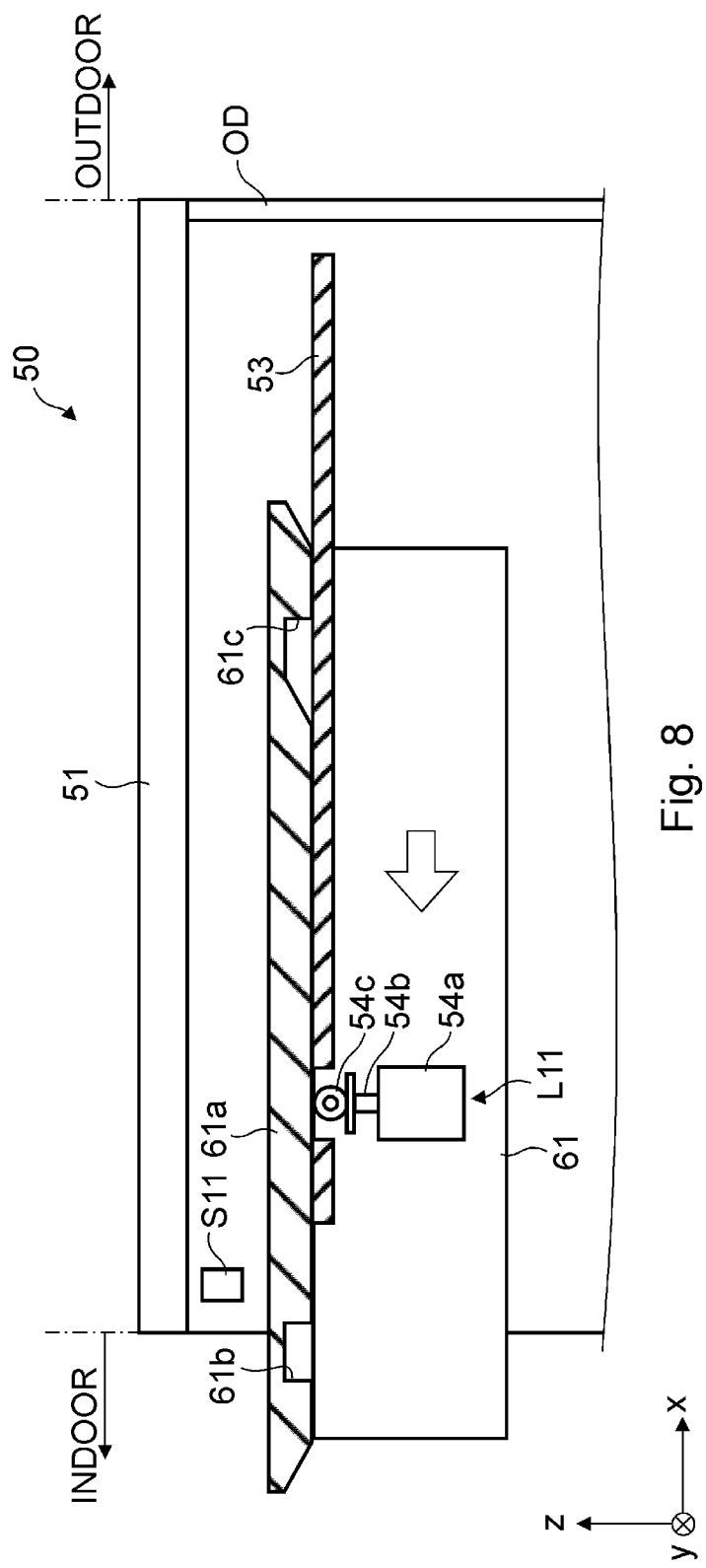
FIG. 8 is a schematic side view showing a state in which the returnable box 61 is pulled out from the storage space equipped with the sensor S11 and the locking mechanism L11 into inside the building in FIG. 2.

Note that, as shown in FIG. 5, the sensor S11 is disposed between the indoor-side end part of the returnable box 61 stored in the shelf 50 and the inner door ID. Therefore, in the state in which the returnable box 61 is stored in the shelf 50 as shown in FIG. 5, the sensor S11 does not detect the returnable box 61. Further, when the returnable box 61 is moved to the indoor side (i.e., moved to inside the building) as shown in FIG. 8 (which will be described in detail later), the sensor S11 detects the returnable box 61.

The same applies to the other sensors S12 to S14, S21 to S24, and S31 to S34, and the same applies to the other returnable boxes 62 and 63.

<Details of Rail 53 and Locking Mechanism L11>

Figure 6:
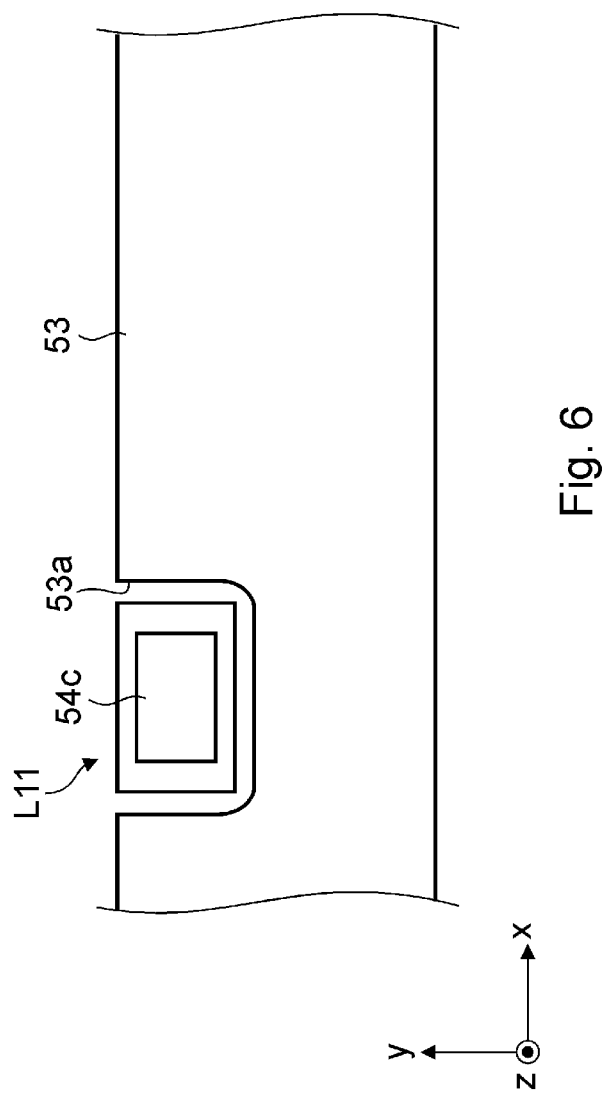
FIG. 6 is a plan view showing a positional relationship between a rail 53 and a locking mechanism L11.

Details of the rail 53 (i.e., one of the rails 53) and the locking mechanism L11 will be described hereinafter with reference to FIG. 6 as well as FIGS. 3 to 5. FIG. 6 is a plan view showing a positional relationship between the rail 53 and the locking mechanism L11.

Note that the same applies to the other locking mechanism L12 to L14, L21 to L24, and L31 to L34, and the same applies to the other returnable boxes 62 and 63.

As shown in FIGS. 3 to 5, the protrusion part 61a (i.e., one of the protrusion parts 61a) of the returnable box 61 slides on the rail 53 extending in the x-axis direction, and the returnable box 61 is put in and stored in the shelf 50.

The locking mechanism L11 shown in FIGS. 3 to 5 is, for example, a solenoid lock, and includes a body part 54a, a pin 54b, and a roller 54c. As shown in FIGS. 3 to 5, the locking mechanism L11 is disposed on the underside of the indoor-side end part of the rail 53.

Note that as shown in FIGS. 3 to 5 and FIG. 6, a cut-out part 53a through which the pin 54b and the roller 54c of the locking mechanism L11 pass is provided (i.e., formed) in the rail 53. A through-hole may be provided (i.e., formed) in place of the cut-out part 53a.

The pin 54b of the locking mechanism L11 is pressed, for example, by an elastic body such as a spring so that the pin 54b passes through the rail 53 and comes into contact with the protrusion part 61a of the returnable box 61, which slides on the rail 53.

Note that the roller 54c is provided at the tip of the pin 54b which slides on the protrusion part 61a. The roller 54c is made of, for example, plastic. By the roller 54c, the friction coefficient between the protrusion part 61a of the returnable box 61 and the locking mechanism L11 can be reduced, and the generation of wear particles can be prevented.

As shown in FIGS. 3 to 5, on the lower surface of the protrusion part 61a of the returnable box 61, a recessed part (a first recessed part) 61b is provided (i.e., formed) in the indoor-side end part of the returnable box 61, which is the end part of the returnable box 61 that is positioned on the indoor side when the returnable box 61 is stored in the shelf 50, and another recessed part (a second recessed part) 61c is provided (i.e., formed) in the outdoor-side end part of the returnable box 61, which is the end part of the returnable box 61 that is positioned on the outdoor side when the returnable box 61 is stored in the shelf 50. Further, in each of the indoor-side and outdoor-side end parts of the protrusion part 61a (i.e., at each of both ends of the protrusion part 61a in the sliding direction), the lower surface is inclined from the horizontal surface so as to get closer to the upper surface, and the thickness of the protrusion part 61a is thereby reduced toward each of both ends of the protrusion part 61a in the sliding direction. That is, a tapered part is provided (i.e., formed) at each of both ends of the protrusion part 61a in the sliding direction.

Note that the locking mechanism L11 may be disposed on the upper side of the rail 53. In that case, the recessed parts 61b and 61c are provided (i.e., formed) in the upper surface of the protrusion part 61a of the returnable box 61. Further, at each of both ends of the protrusion part 61a in the sliding direction, the upper surface is inclined from the horizontal surface so as to get closer to the lower surface, and the thickness of the protrusion part 61a is thereby reduced toward each of both ends of the protrusion part 61a in the sliding direction.

Therefore, as shown in FIG. 4, when the returnable box 61 is put in the shelf 50 and the indoor-side end part of the protrusion part 61a of the returnable box 61 abuts against (i.e., comes into contact with) the roller 54c of the locking mechanism L11, the spring of the locking mechanism L11 is physically and gradually compressed along the inclination of the indoor-side end part of the protrusion part 61a. By the above-described configuration, it is possible to make the indoor-side end part of the protrusion part 61a less likely to get caught in the locking mechanism L11, and to gradually increase the pressing force of the locking mechanism L11. Then, in the state in which the spring of the locking mechanism L11 is compressed, the returnable box 61 is moved to the indoor side while the lower surface of the protrusion part 61a and the roller 54c slide on each other.

Then, as shown in FIG. 5, when the recessed part 61b of the protrusion part 61a moves to the position of the locking mechanism L11, the compressed spring of the locking mechanism L11 is released (i.e., is restored to the unpressed state) and the tip of the pin 54b, i.e., the roller 54c, is thereby inserted into the recessed part 61b. Therefore, the returnable box 61 is fixed to the housing 51 and the lid (not shown) of the returnable box 61 is locked. By the locking mechanism L11, it is possible to prevent the returnable box 61 and the consumable commodity or the like stored inside the returnable box 61 from being stolen.

Note that the returnable box 61 is locked while it is stored in the shelf 50. Therefore, it is possible to reduce the power consumption by using, as the locking mechanism L11, a solenoid lock of which the deenergized state (the non-current conducting state) in which the spring is released is the locked state.

Meanwhile, as will be described later in detail, the control unit 100 releases the locking by, for example, changing the state of the locking mechanism L11 to the energized state (the current-conducting state) in which the spring is compressed based on an unlocking instruction from an operator. By the unlocking, in FIG. 5, the projecting part (the pin 54b and the roller 54c) of the locking mechanism L11 retreats from the recessed part 61b of the returnable box 61 (see FIG. 7 which will be described later). By the unlocking, the returnable box 61 can be pulled out from the shelf 50 into inside the building.

In FIG. 5, when the returnable box 61 is pulled out from the shelf 50 into inside the building, the projecting part (the pin 54b and the roller 54c) of the locking mechanism L11 is inserted into the recessed part 61c of the returnable box 61 and the pulled-out returnable box 61 is thereby stopped (i.e., comes to a standstill) (see FIG. 9 which will be described later). That is, when the returnable box 61 is pulled out from the shelf 50, the returnable box 61 can be prevented from falling off from the shelf 50.

As described above, in the delivery shelf system according to this embodiment, the recessed part 61*b* is provided in the indoor-side end part of the protrusion part 61*a* of the returnable box 61, i.e., in the end part of the protrusion part 61*a* that is positioned on the indoor side when the returnable box 61 is stored in the shelf 50. Further, in the indoor-side end part of the shelf 50, the locking mechanism L11 including the projecting part (the pin 54*b* and the roller 54*c*) which is pressed so as to be inserted into the recessed part 61*b* is provided. Therefore, while the returnable box 61 is stored in the shelf 50, as the projecting part (the pin 54*b* and the roller 54*c*) of the locking mechanism L11 is inserted into the recessed part 61*b* of the returnable box 61, the returnable box 61 can be locked to the shelf 50.

Further, in the delivery shelf system according to this embodiment, the recessed part 61*c* is provided in the outdoor-side end part of the protrusion part 61*a* of the returnable box 61, i.e., in the end part of the protrusion part 61*a* that is positioned on the outdoor side when the returnable box 61 is stored in the shelf 50. Therefore, when the locking by the locking mechanism L11 is released and the returnable box 61 is pulled out from the shelf 50 into inside the building, the projecting part (the pin 54*b* and the roller 54*c*) of the locking mechanism L11 is inserted into the recessed part 61*c* of the returnable box 61 and the pulled-out returnable box 61 is thereby stopped. That is, when the returnable box 61 is pulled out from the shelf 50, the returnable box 61 can be prevented from falling off from the shelf 50.

As described above, in the delivery shelf system according to this embodiment, it is possible to lock the returnable box 61 to the shelf 50 while the returnable box 61 is stored in the shelf 50, and to prevent the returnable box 61 from falling off from the shelf 50 when the returnable box 61 is pulled out from the shelf 50.

Note that the locking mechanism L11 is not limited to the solenoid lock, and may be any device or the like that can regulate the movement of the returnable box 61 and lock the lid (not shown) of the returnable box 61. For example, the pin 54*b* may be mechanically moved. Alternatively, a rotating-type locking mechanism that does not use the pin 54*b* may be used.

Further, the locking of the movement of the returnable box 61 and the locking of the lid of the returnable box 61 may be separately carried out.

<Operation of Delivery Shelf System>

Next, operations performed by the delivery shelf system according to this embodiment will be described.

Firstly, an operation in which, for example, a delivery person puts a returnable box 61 in the shelf 50 from outside a building will be described with reference to FIGS. 3 to 5.

Firstly, as shown in FIG. 3, the outer door OD is opened and a returnable box 61 is pushed in such a manner that the protrusion part 61*a* (i.e., two protrusion parts 61*a* on both sides) of the returnable box 61 slides on the rail 53 (i.e., two rails 53) toward the indoor side.

Note that the locking mechanism L11 is in a deenergized state in which the spring is released (i.e., is in the unpressed state), and the sensor S11 is in a non-detecting state in which it does not detect the returnable box 61.

Next, as shown in FIG. 4, when the indoor-side end part of the protrusion part 61*a* of the returnable box 61 abuts against the roller 54*c* of the locking mechanism L11, the spring of the locking mechanism L11, which is in the deenergized state, is physically and gradually compressed along the inclination of the indoor-side end part of the protrusion part 61*a*. In the state in which the spring of the locking mechanism L11 is compressed, the returnable box 61 is moved to the indoor side while the lower surface of the protrusion part 61*a* and the roller 54*c* slide on each other.

Note that the locking mechanism L11 remains in the deenergized state and the sensor S11 remains in the non-detecting state.

Then, as shown in FIG. 5, when the recessed part 61*b* disposed in the indoor-side end part of the protrusion part 61*a* is moved to the position of the locking mechanism L11, the compressed spring of the locking mechanism L11 is released (i.e., is restored to the unpressed state) and the tip of the pin 54*b*, i.e., the roller 54*c*, is thereby inserted into the recessed part 61*b*. As a result, the returnable box 61 is fixed to the housing 51. Then, the outer door OD is closed.

As described above, the recessed part 61*b* is provided in the indoor-side end part of the protrusion part 61*a* of the returnable box 61, i.e., in the end part of the protrusion part 61*a* that is positioned on the indoor side when the returnable box 61 is stored in the shelf 50. Further, in the indoor-side end part of the shelf 50, the locking mechanism L11 including the projecting part (the pin 54*b* and the roller 54*c*) which is pressed so as to be inserted into the recessed part 61*b* is provided. Therefore, as shown in FIG. 5, while the returnable box 61 is stored in the shelf 50, as the projecting part (the pin 54*b* and the roller 54*c*) of the locking mechanism L11 is inserted into the recessed part 61*b* of the returnable box 61, the returnable box 61 can be locked to the shelf 50.

During this process, the locking mechanism L11 remains in the deenergized state and the sensor S11 remains in the non-detecting state.

Figure 7:
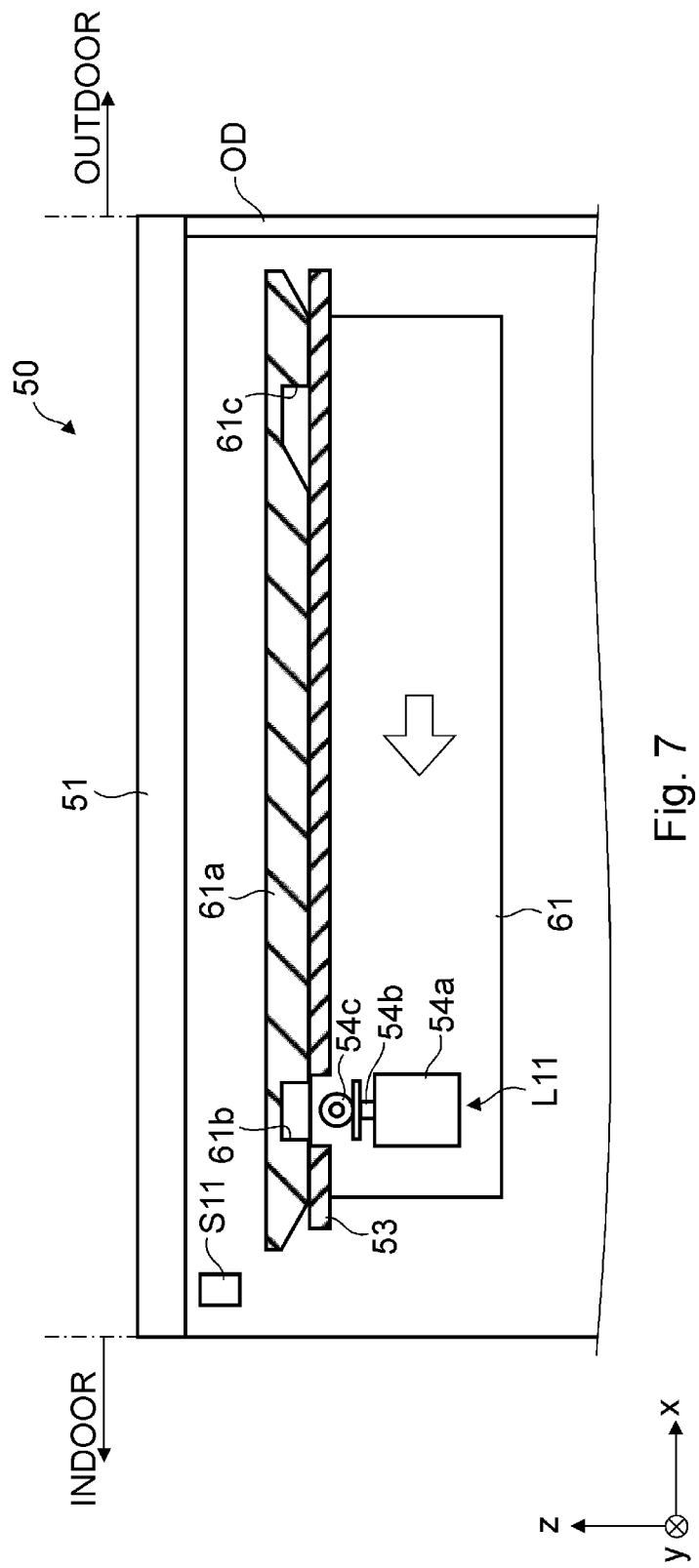
FIG. 7 is a schematic side view showing a state in which the returnable box 61 is pulled out from the storage space equipped with the sensor S11 and the locking mechanism L11 into inside the building in FIG. 2.

Next, an operation in which, for example, a recipient pulls out the returnable box 61 from the shelf 50 will be described the with reference to FIGS. 7 to 9. FIGS. 7 to 9 are schematic side views showing states in which the returnable box 61 is pulled out from the storage space equipped with the sensor S11 and the locking mechanism L11 into inside the building in FIG. 2

Firstly, as shown in FIG. 7, when the inner door ID is opened, the control unit 100 changes, for example, the state of the locking mechanism L11 from the deenergized state to the energized state based on an unlocking instruction from the recipient. Therefore, the spring of the locking mechanism L11 is compressed, and the projecting part (the pin 54*b* and the roller 54*c*) of the locking mechanism L11 is retracted from the recessed part 61*b* of the returnable box 61 and hence the locking is released.

Note that the sensor S11 remains in the non-detecting state.

Next, as shown in FIG. 8, for example, when the recipient pulls out the returnable box 61, the protrusion part 61*a* of the returnable box 61 slides on the rail 53 toward the indoor side and the sensor S11 detects the returnable box 61. Therefore, the state of the sensor S11 changes from the non-detecting state to the detecting state. The control unit 100 changes, based on a signal from the sensor S11, the state of the locking mechanism L11 from the energized state to the deenergized state. That is, after the state of the locking mechanism L11 is changed to the energized state, when the sensor S11 detects the returnable box 61, the locking mechanism L11 returns to the deenergized state.

Note that in the state in which the spring of the locking mechanism L11 is physically compressed by the protrusion part 61*a* of the returnable box 61, the returnable box 61 is moved to the indoor side while the lower surface of the protrusion part 61*a* and the roller 54*c* slide on each other.

Figure 9:
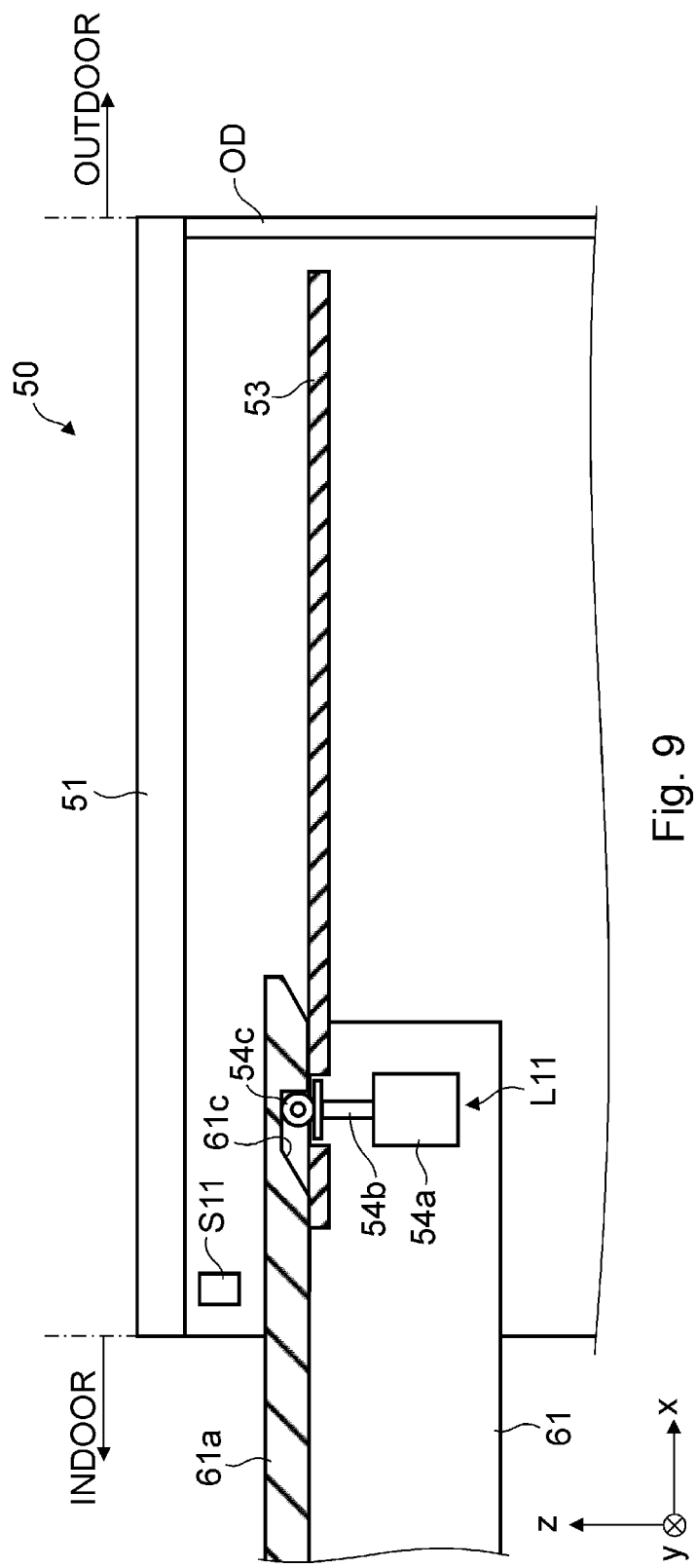
FIG. 9 is a schematic side view showing a state in which the returnable box 61 is pulled out from the storage space equipped with the sensor S11 and the locking mechanism L11 into inside the building in FIG. 2.

Then, as shown in FIG. 9, when the recessed part 61*c* disposed in the outdoor-side end part of the protrusion part 61*a* is moved to the position of the locking mechanism L11, the compressed spring of the locking mechanism L11 is released (i.e., is restored to the unpressed state) and the tip of the pin 54*b*, i.e., the roller 54*c*, is thereby inserted into the recessed part 61*c*. As a result, the returnable box 61 is fixed to the housing 51, and thereby stopped. That is, when the returnable box 61 is pulled out from the shelf 50, the returnable box 61 can be prevented from falling off from the shelf 50.

Note that the locking mechanism L11 remains in the deenergized state and the sensor S11 remains in the detecting state.

As described above, the recessed part 61*c* is provided in the outdoor-side end part of the protrusion part 61*a* of the returnable box 61, i.e., in the end part of the protrusion part 61*a* that is positioned on the outdoor side when the returnable box 61 is stored in the shelf 50.

Therefore, as shown in FIGS. 7 to 9, when the locking by the locking mechanism L11 is released and the returnable box 61 is pulled out from the shelf 50 into inside the building, the projecting part (the pin 54*b* and the roller 54*c*) of the locking mechanism L11 is inserted into the recessed part 61*c* of the returnable box 61 and the pulled-out returnable box 61 is thereby stopped. That is, when the returnable box 61 is pulled out from the shelf 50, the returnable box 61 can be prevented from falling off from the shelf 50.

Further, the delivery shelf system includes the sensor S11 that detects the movement of the returnable box 61 from the storage position of the returnable box 61 in the shelf 50 toward the indoor side. Therefore, after the locking by the locking mechanism L11 is released, when the sensor S11 detects the movement of the returnable box 61, the control unit 100 changes the state of the locking mechanism L11 from the unlocked state to the locked state. By the above-described configuration, when the projecting part (the pin 54*b* and the roller 54*c*) is retracted from the recessed part 61*b* by the unlocking and the returnable box 61 is pulled out from the shelf 50 into inside the building, the state of the locking mechanism L11 is automatically changed from the unlocked state to the locked state. Therefore, it is possible to, when the returnable box 61 is pulled out from the shelf 50, automatically insert the projecting part (the pin 54*b* and the roller 54*c*) into the recessed part 61*c*, and thereby to prevent the returnable box 61 from falling off from the shelf 50.

Figure 10:
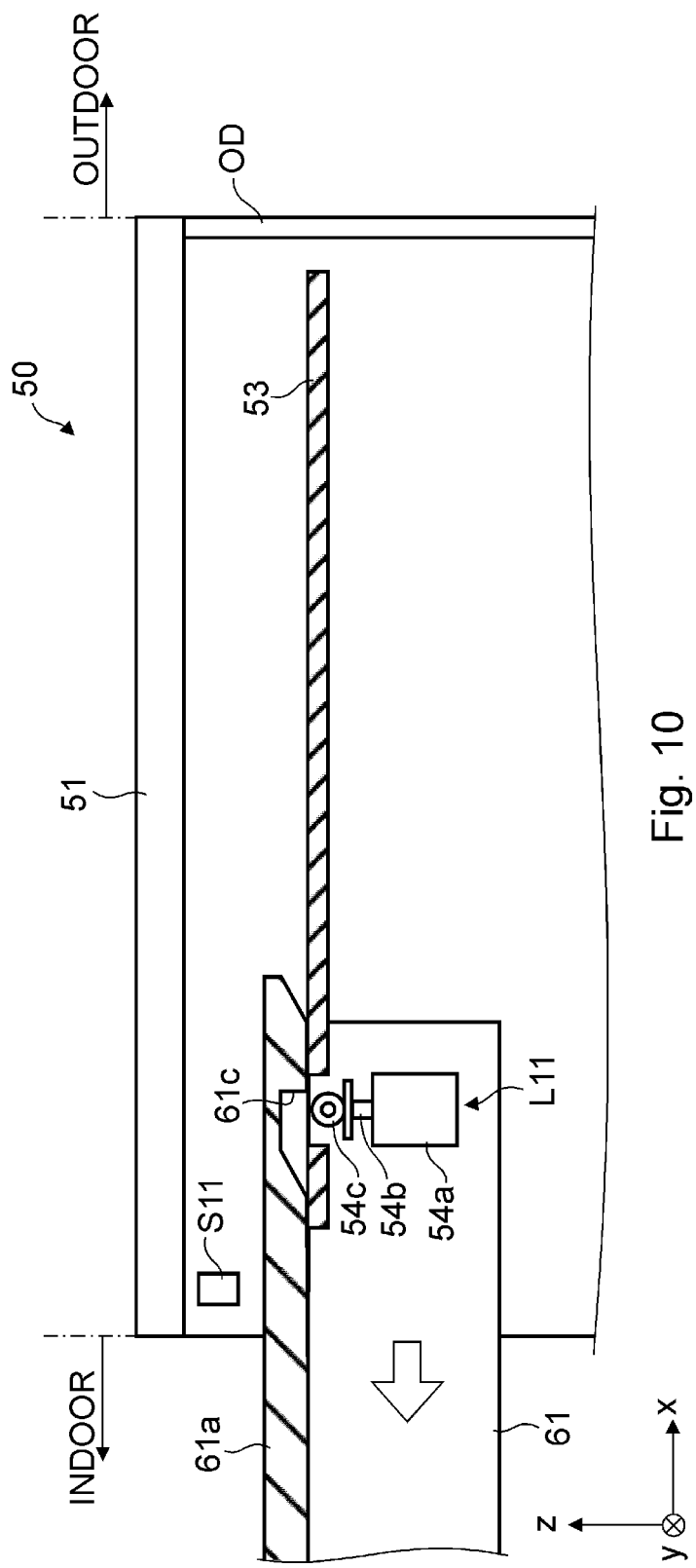
FIG. 10 is a schematic side view showing a state in which the returnable box 61 is taken out from the storage space equipped with the sensor S11 and the locking mechanism L11 into inside the building in FIG. 2.
Figure 11:
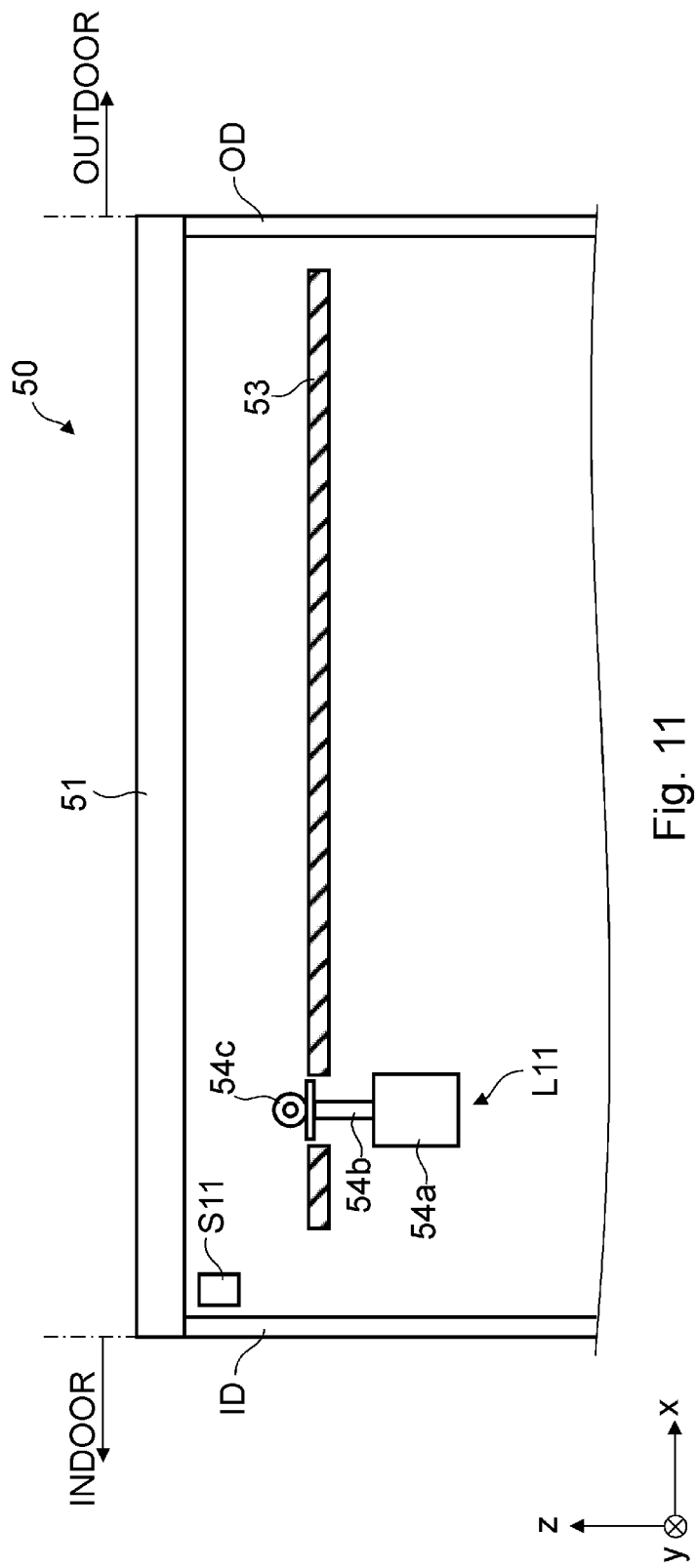
FIG. 11 is a schematic side view showing a state in which the returnable box 61 is taken out from the storage space equipped with the sensor S11 and the locking mechanism L11 into inside the building in FIG. 2.

Next, an operation in which, for example, a recipient takes out a returnable box 61 from the shelf 50 will be described with reference to FIGS. 10 and 11. FIGS. 10 and 11 are schematic side views showing a state in which a returnable box 61 is taken out from the storage space equipped with the sensor S11 and the locking mechanism L11 into inside the building in FIG. 2.

Firstly, as shown in FIG. 10, the control unit 100 changes, for example, the state of the locking mechanism L11 from the deenergized state to the energized state based on an unlocking instruction from the recipient. Therefore, the spring of the locking mechanism L11 is compressed, and the projecting part (the pin 54*b* and the roller 54*c*) of the locking mechanism L11 is retracted from the recessed part 61*c* of the returnable box 61 and hence the locking is released.

Note that the sensor S11 remains in the detecting state.

Then, as shown in FIG. 11, for example, when the recipient takes out the returnable box 61 from the shelf 50, the sensor S11 ceases to detect the returnable box 61. Therefore, the state of the sensor S11 changes from the detecting state to the non-detecting state. The control unit 100 changes, based on a signal from the sensor S11, the state of the locking mechanism L11 from the energized state to the deenergized state. That is, after the state of the locking mechanism L11 is changed to the energized state, when the sensor S11 ceases to detect the returnable box 61, the state of the locking mechanism L11 returns to the deenergized state.

Note that after the control unit 100 changes the state of the locking mechanism L11 to the energized state, it may return the state of locking mechanism L11 to the deenergized state after the lapse of a predetermined time regardless of the signal from the sensor S11. Alternatively, the control unit 100 may not change the state of the locking mechanism L11 from the deenergized state to the energized state, and the recipient may lift and take out the returnable box 61 in that state.

Next, an operation in which, for example, a recipient pushes a returnable box 61 from inside the building into the shelf 50 will be described the with reference to FIGS. 12 to 16. FIGS. 12 to 16 are schematic side views showing a state in which a returnable box 61 is pushed from inside the building into the storage space equipped with the sensor S11 and the locking mechanism L11 in FIG. 2.

Figure 12:
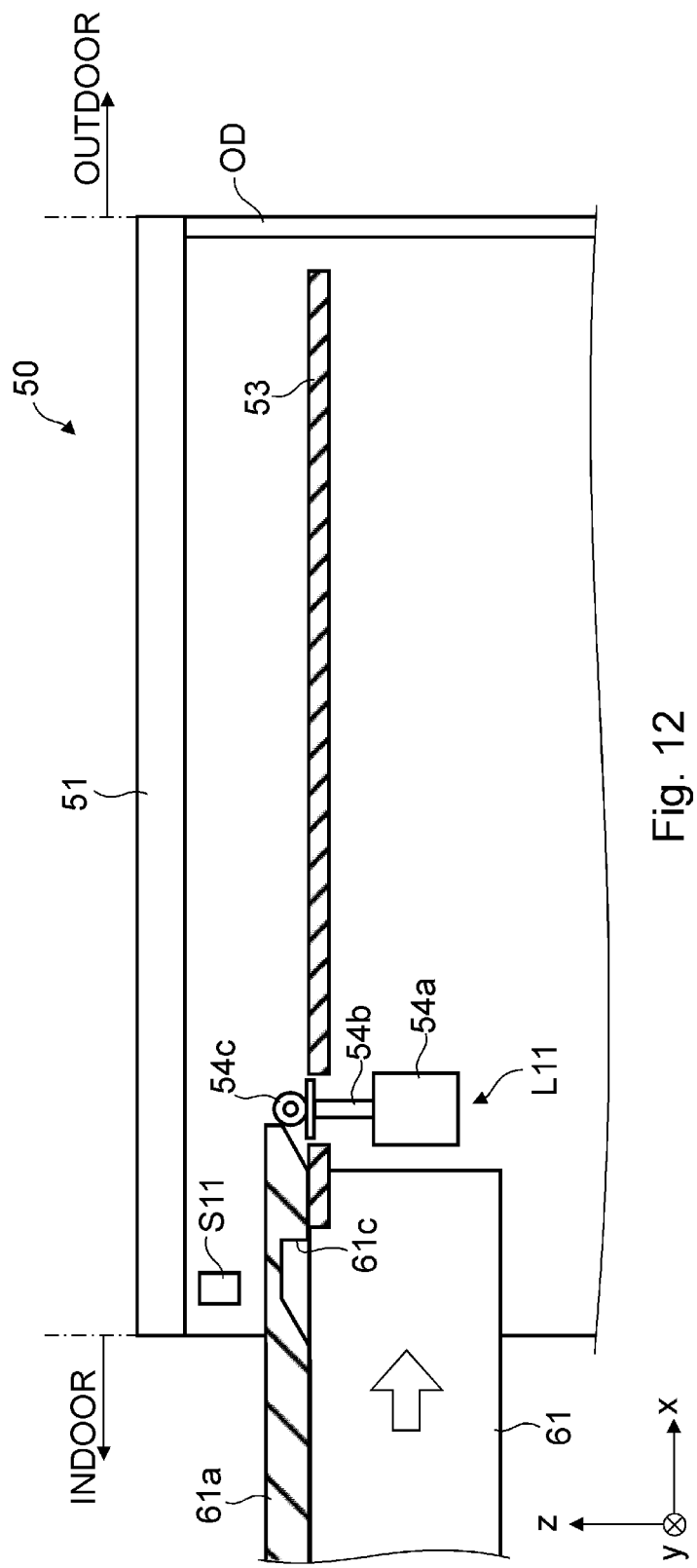
FIG. 12 is a schematic side view showing a state in which the returnable box 61 is pushed from inside the building into the storage space equipped with the sensor S11 and the locking mechanism L11 in FIG. 2.

Firstly, as shown in FIG. 12, the inner door ID is opened and a returnable box 61 is pushed in such a manner that the protrusion part 61*a* (i.e., two protrusion parts 61*a* on both sides) of the returnable box 61 slides on the rail 53 (i.e., two rails 53) toward the outdoor side. During this process, the sensor S11 detects the returnable box 61, and the state of the sensor S11 changes from the non-detecting state to the detecting state.

Figure 13:
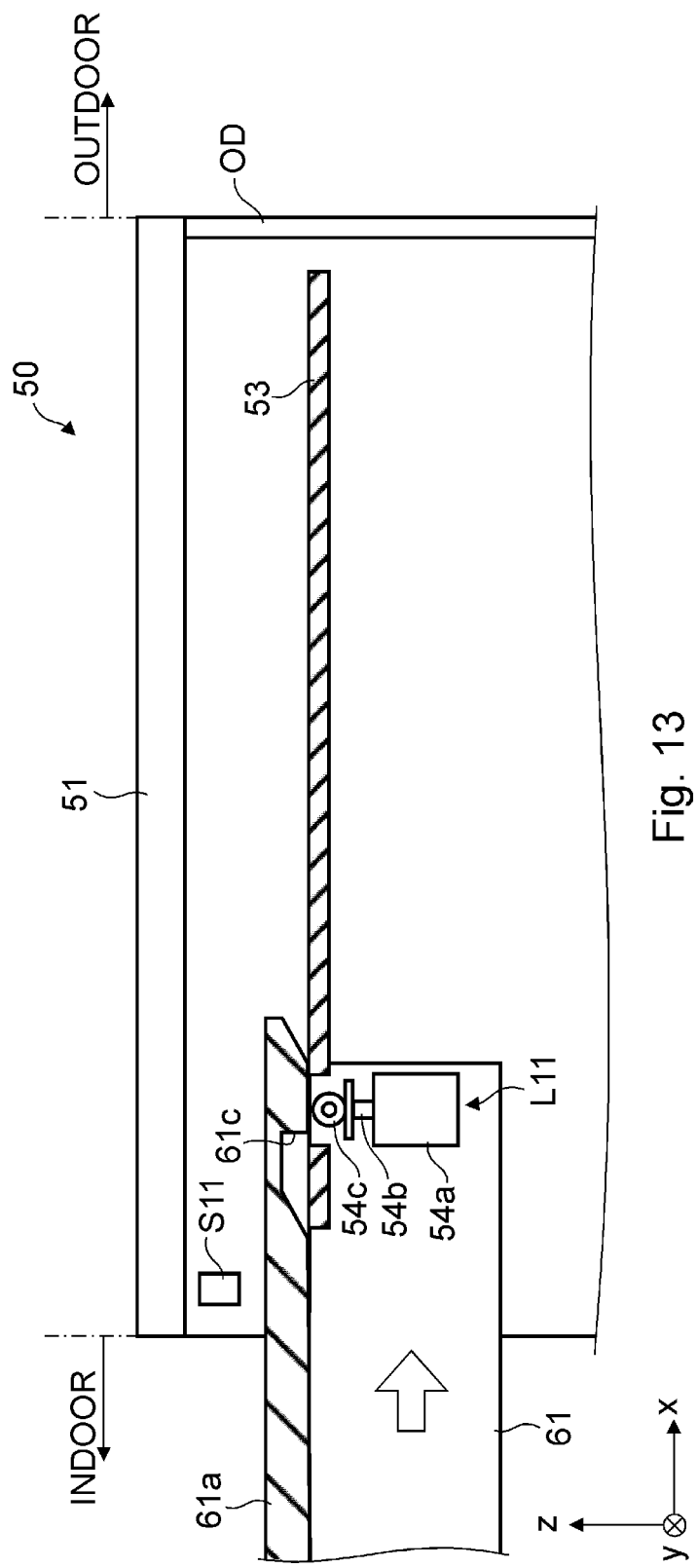
FIG. 13 is a schematic side view showing a state in which the returnable box 61 is pushed from inside the building into the storage space equipped with the sensor S11 and the locking mechanism L11 in FIG. 2.

Next, as shown in FIGS. 12 and 13, when the outdoor-side end part of the protrusion part 61*a* of the returnable box 61 abuts against the roller 54*c* of the locking mechanism L11, the spring of the locking mechanism L11, which is in the deenergized state, is physically and gradually compressed along the inclination of the outdoor-side end part of the protrusion part 61*a*. Then, in the state in which the spring of the locking mechanism L11 is compressed, the returnable box 61 is moved to the outdoor side while the lower surface of the protrusion part 61*a* and the roller 54*c* slide on each other.

Note that the locking mechanism L11 remains in the deenergized state and the sensor S11 remains in the detecting state.

Figure 14:
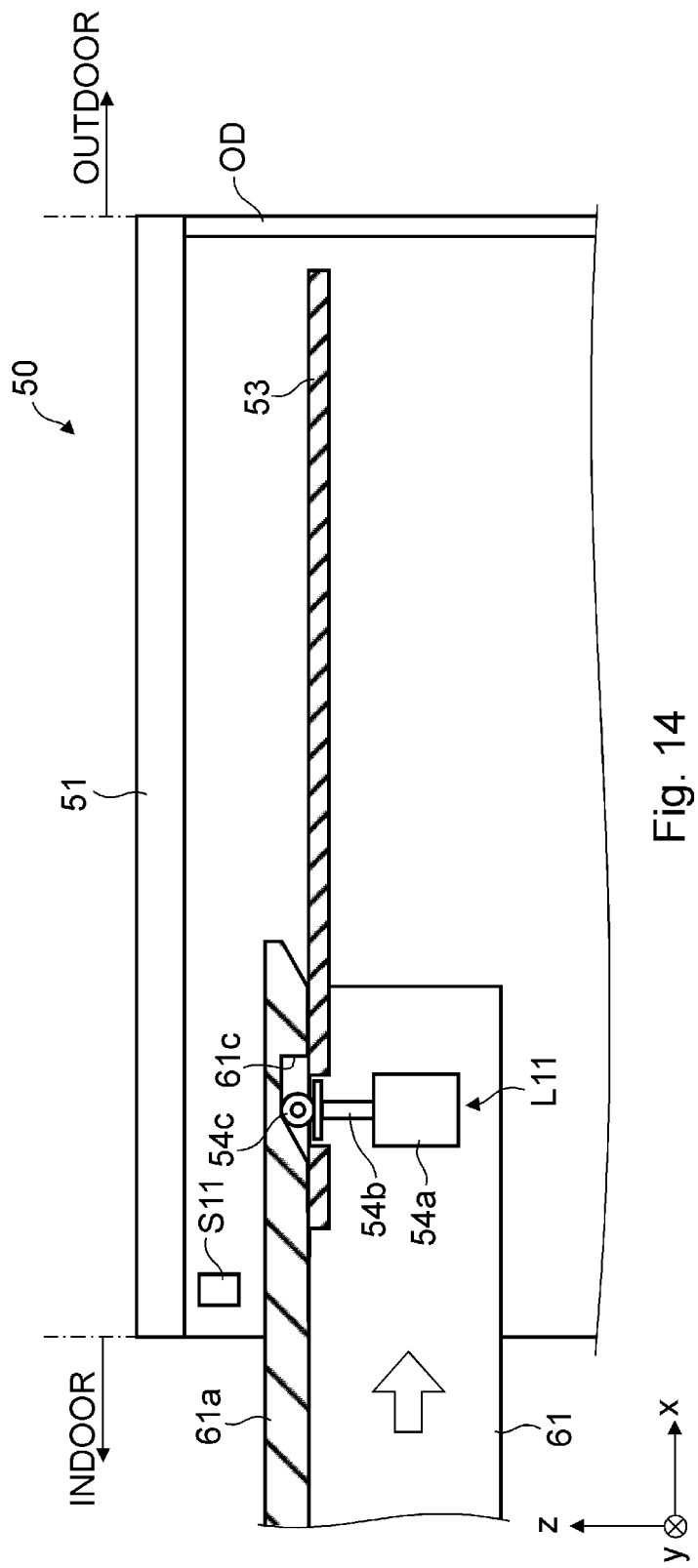
FIG. 14 is a schematic side view showing a state in which the returnable box 61 is pushed from inside the building into the storage space equipped with the sensor S11 and the locking mechanism L11 in FIG. 2.

Next, as shown in FIG. 14, when the recessed part 61*c* disposed in the outdoor-side end part of the protrusion part 61*a* is moved to the position of the locking mechanism L11, the compressed spring of the locking mechanism L11 is released (i.e., is restored to the unpressed state) and the tip of the pin 54*b*, i.e., the roller 54*c*, is thereby inserted into the recessed part 61*c*.

Note that the locking mechanism L11 remains in the deenergized state and the sensor S11 remains in the detecting state.

As shown in FIG. 14, the opening of the recessed part 61*c* disposed in the outdoor-side end part of the protrusion part 61*a* is inclined so that the opening becomes larger toward the indoor side. Therefore, when the returnable box 61 is pushed back toward the outdoor side, the recessed part 61*c* of the protrusion part 61*a* can pass through the projecting part (the pin 54*b* and the roller 54*c*) of the locking mechanism L11 without releasing the locking by the locking mechanism L11. During this process, the spring of the locking mechanism L11, which is in the deenergized state, is physically and gradually compressed along the inclination of the recessed part 61c of the protrusion part 61a.

Note that when the opening of the recessed part 61c is not inclined in a manner similar to that of the recessed part 61b, the control unit 100 may release the locking by, for example, changing the state of the locking mechanism L11 from the deenergized state to the energized state based on an unlocking instruction from the recipient.

Figure 15:
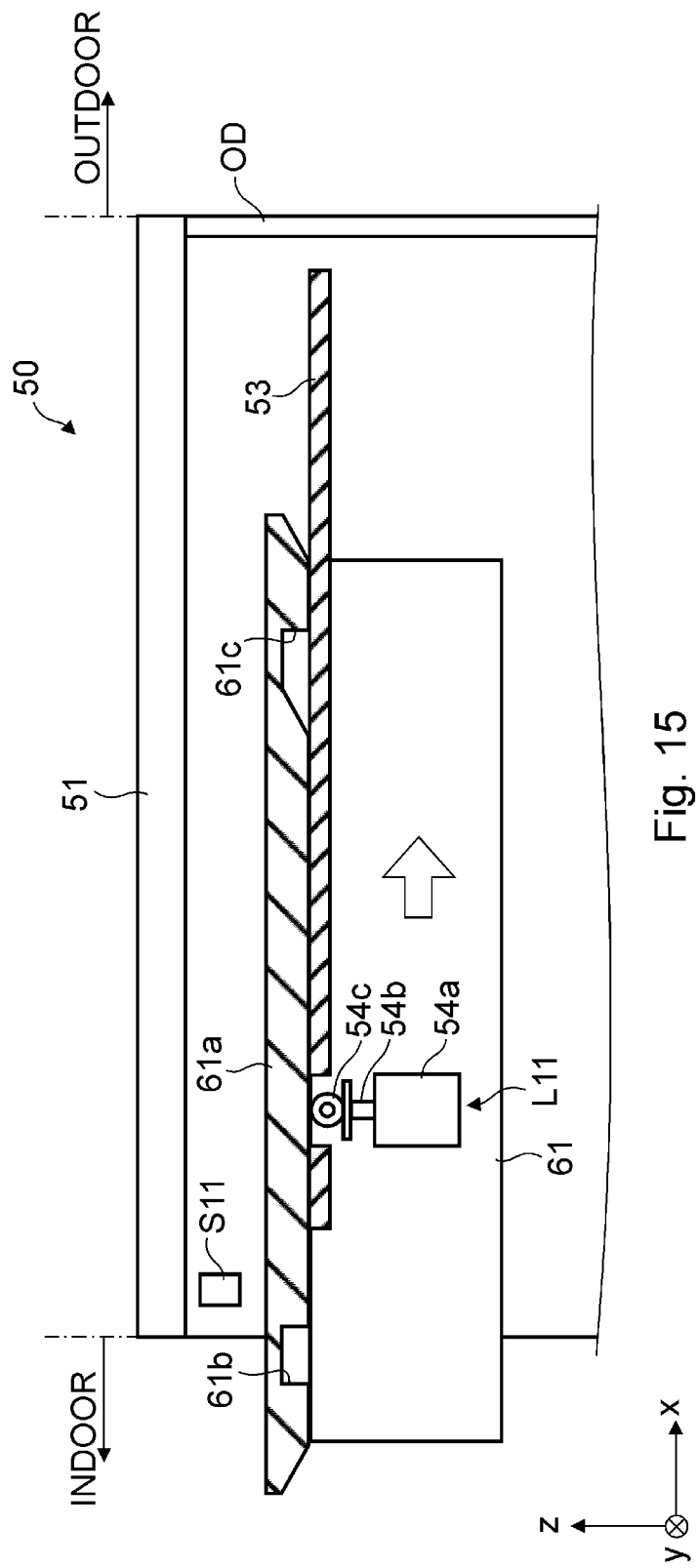
FIG. 15 is a schematic side view showing a state in which the returnable box 61 is pushed from inside the building into the storage space equipped with the sensor S11 and the locking mechanism L11 in FIG. 2.

Next, as shown in FIG. 15, in the state in which the spring of the locking mechanism L11 is compressed, the returnable box 61 is moved to the indoor side while the lower surface of the protrusion part 61a and the roller 54c slide on each other.

Note that the locking mechanism L11 remains in the deenergized state and the sensor S11 remains in the detecting state.

Figure 16:
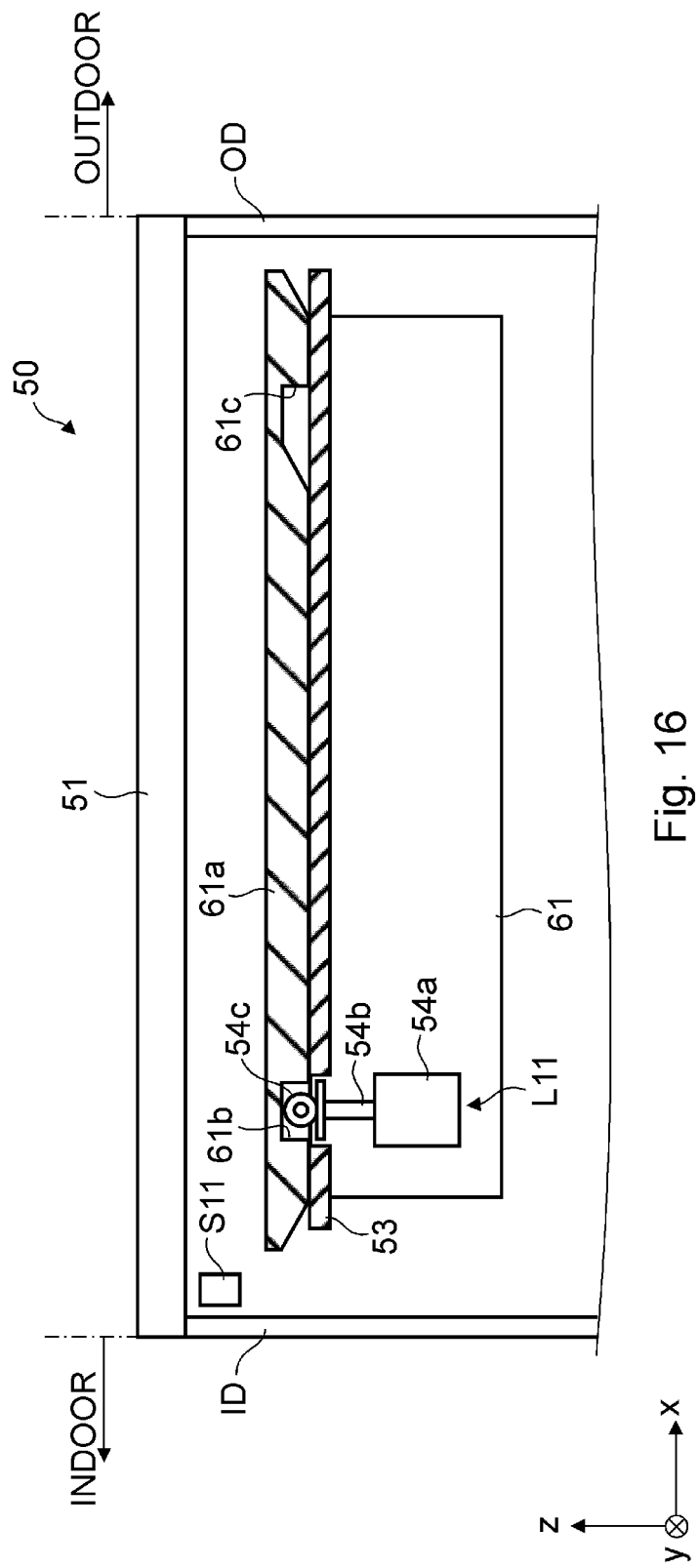
FIG. 16 is a schematic side view showing a state in which the returnable box 61 is pushed from inside the building into the storage space equipped with the sensor S11 and the locking mechanism L11 in FIG. 2.

Then, as shown in FIG. 16, when the recessed part 61b disposed in the indoor-side end part of the protrusion part 61a is moved to the position of the locking mechanism L11, the compressed spring of the locking mechanism L11 is released (i.e., is restored to the unpressed state) and the tip of the pin 54b, i.e., the roller 54c, is thereby inserted into the recessed part 61b. As a result, the returnable box 61 is fixed to the housing 51. Then, the inner door ID is closed.

Note that although the sensor S11 ceases to detect the returnable box 61 and its state changes from the detecting state to the non-detecting state, the locking mechanism L11 remains in the deenergized state.

Figure 17:
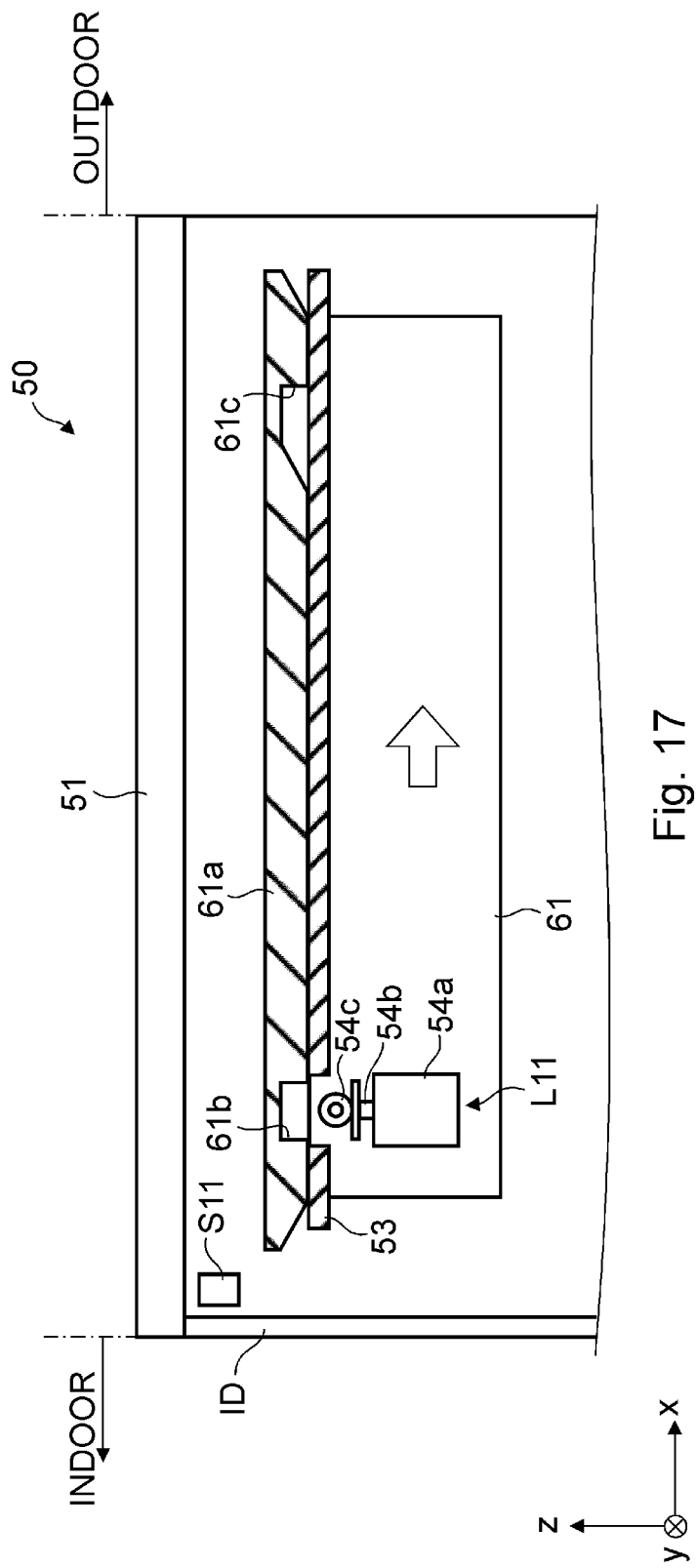
FIG. 17 is a schematic side view showing a state in which the returnable box 61 is taken out from the storage space equipped with the sensor S11 and the locking mechanism L11 in FIG. 2 to outside the building.
Figure 18:
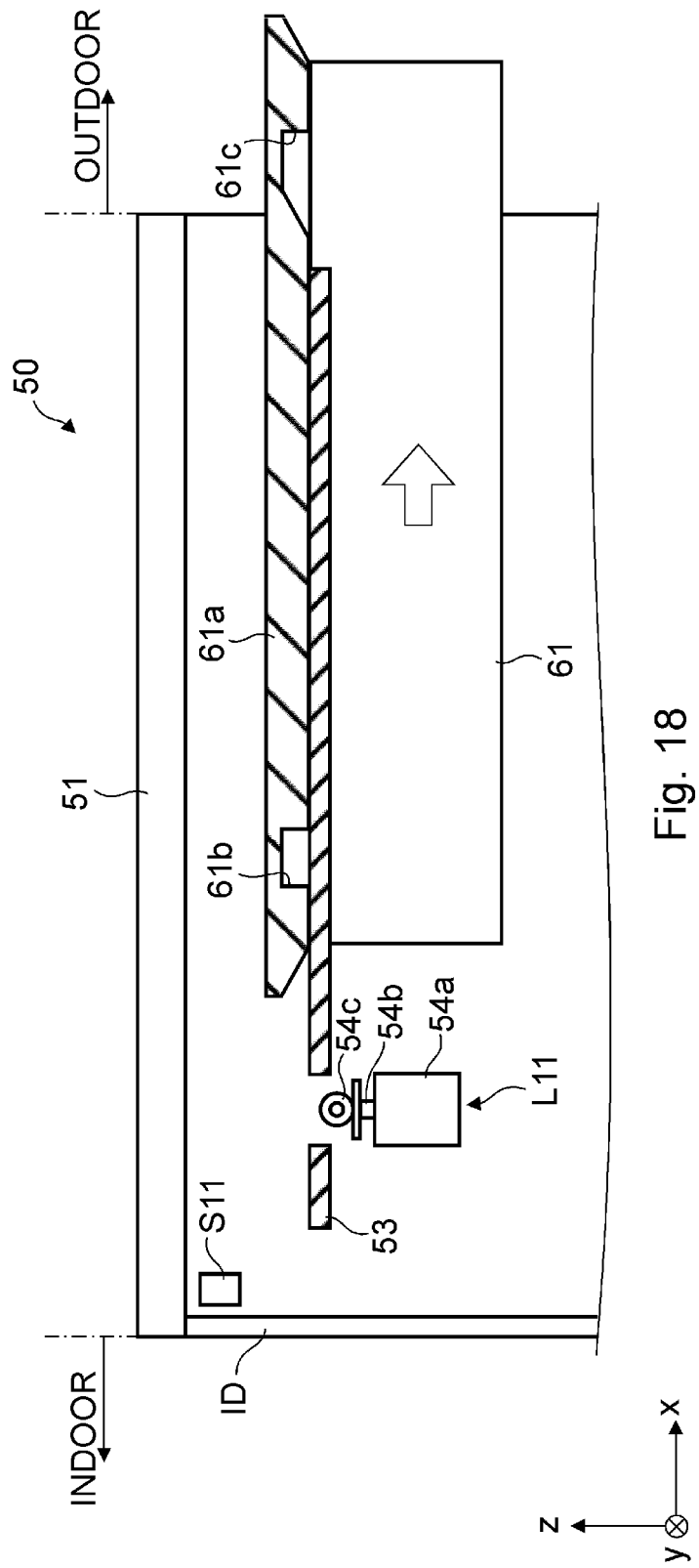
FIG. 18 is a schematic side view showing a state in which the returnable box 61 is taken out from the storage space equipped with the sensor S11 and the locking mechanism L11 in FIG. 2 to outside the building.

Lastly, an operation in which, for example, a delivery person takes out a returnable box 61 from the shelf 50 will be described with reference to FIGS. 17 and 18. FIGS. 17 and 18 are schematic side views showing a state in which a returnable box 61 is taken out from the storage space equipped with the sensor S11 and the locking mechanism L11 into inside the building in FIG. 2.

Firstly, as shown in FIG. 17, the control unit 100 changes, for example, the state of the locking mechanism L11 from the deenergized state to the energized state based on an unlocking instruction from the delivery person. Therefore, the spring of the locking mechanism L11 is compressed, and the projecting part (the pin 54b and the roller 54c) of the locking mechanism L11 is retracted from the recessed part 61b of the returnable box 61 and hence the locking is released.

Note that the sensor S11 remains in the non-detecting state.

Then, as shown in FIG. 18, the protrusion part 61a (i.e., two protrusion parts 61a on both sides) of the returnable box 61 slides on the rail 53 (i.e., two rails 53) toward the indoor side, and the returnable box 61 is pulled out. Since the sensor S11 remains in the non-detecting state, for example, the control unit 100 changes the state of the locking mechanism L11 to the energized state, and then, after the lapse of a predetermined time, returns the state of the locking mechanism L11 to the deenergized state.

Needless to say, the state of the locking mechanism L11 may be changed from the energized state to the deenergized state based on an unlocking instruction from the delivery person.

As described above, in the delivery shelf system according to this embodiment, the recessed part 61b is provided in the indoor-side end part of the protrusion part 61a of the returnable box 61, i.e., in the end part of the protrusion part 61a that is positioned on the indoor side when the returnable box 61 is stored in the shelf 50. Further, in the indoor-side end part of the shelf 50, the locking mechanism L11 including the projecting part (the pin 54b and the roller 54c) which is pressed so as to be inserted into the recessed part 61b is provided. Therefore, as shown in FIG. 5, while the returnable box 61 is stored in the shelf 50, as the projecting part (the pin 54b and the roller 54c) of the locking mechanism L11 is inserted into the recessed part 61b of the returnable box 61, the returnable box 61 can be locked to the shelf 50.

Further, in the delivery shelf system according to this embodiment, the recessed part 61c is provided in the outdoor-side end part of the protrusion part 61a of the returnable box 61, i.e., in the end part of the protrusion part 61a that is positioned on the outdoor side when the returnable box 61 is stored in the shelf 50. Therefore, as shown in FIGS. 7 to 9, when the locking by the locking mechanism L11 is released and the returnable box 61 is pulled out from the shelf 50 into inside the building, the projecting part (the pin 54b and the roller 54c) of the locking mechanism L11 is inserted into the recessed part 61c of the returnable box 61 and the pulled-out returnable box 61 is thereby stopped. That is, when the returnable box 61 is pulled out from the shelf 50, the returnable box 61 can be prevented from falling off from the shelf 50.

As described above, in the delivery shelf system according to this embodiment, it is possible to lock the returnable box 61 to the shelf 50 while the returnable box 61 is stored in the shelf 50, and to prevent the returnable box 61 from falling off from the shelf 50 when the returnable box 61 is pulled out from the shelf 50.

In the above-described examples, the various programs include instructions (or software codes) that, when loaded into a computer, cause the computer to perform one or more of the functions described in the embodiments. The various programs may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The various programs may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery shelf system comprising:
   a shelf extending from an exterior of a building to an interior thereof; and
   a returnable box configured to be stored and slidably supported in the shelf, wherein
   upon the returnable box being delivered, it can be pushed from outside the building into the shelf, and the returnable box stored in the shelf can be pulled out from the shelf from inside the building, and wherein
   a first recessed part is provided in an indoor-side end part of the returnable box and a second recessed part is provided in an outdoor-side end part thereof, the indoor-side end part being an end part of the returnable box that is positioned on an indoor side when the returnable box is stored in the shelf, a locking mechanism including a projecting part is provided at the indoor-side end part of the shelf, the projecting part being configured to be pressed and inserted into the first recessed part or into the second recessed part, the projecting part is inserted into the first recessed part while the returnable box is stored in the shelf, so that the returnable box is locked to the shelf, and when the projecting part is retracted from the first recessed part by releasing the locking and the returnable box is pulled out from the shelf into inside the building, the projecting part is inserted into the second recessed part and the pulled-out returnable box is thereby stopped, the second recessed part is inclined with respect to an upper surface of the returnable box toward an indoor side.

2. The delivery shelf system according to claim 1, wherein the second recessed part becomes larger toward the indoor side, and when the pulled-out returnable box is pushed back from inside the building into the shelf, the second recessed part passes through the projecting part without unlocking the returnable box.

3. A delivery shelf system comprising:

a shelf extending from an exterior of a building to an interior thereof;

a returnable box configured to be stored and slidably supported in the shelf, a sensor configured to detect a movement of the returnable box from a storage position of the returnable box in the shelf toward an indoor side, wherein upon the returnable box being delivered, it can be pushed from outside the building into the shelf, and the returnable box stored in the shelf can be pulled out from the shelf from inside the building, and wherein a first recessed part is provided in an indoor-side end part of the returnable box and a second recessed part is provided in an outdoor-side end part thereof, the indoor-side end part being an end part of the returnable box that is positioned on an indoor side when the returnable box is stored in the shelf, a locking mechanism including a projecting part is provided at the indoor-side end part of the shelf, the projecting part being configured to be pressed and inserted into the first recessed part or into the second recessed part, the projecting part is inserted into the first recessed part while the returnable box is stored in the shelf, so that the returnable box is locked to the shelf, when the projecting part is retracted from the first recessed part by releasing the locking and the returnable box is pulled out from the shelf into inside the building, the projecting part is inserted into the second recessed part and the pulled-out returnable box is thereby stopped, and after unlocking the returnable box, when the sensor has detected the movement of the returnable box, a state of the returnable box is changed from an unlocked state to a locked state.

4. The delivery shelf system according to claim 1, wherein the locking mechanism is a solenoid lock configured to retract the projecting part and thereby unlock the returnable box in an energized state.

5. The delivery shelf system according to claim 1, wherein a roller is provided at a tip of the projecting part.

6. The delivery shelf system according to claim 1, wherein
the shelf comprises a housing and a pair of support members extending in a depth direction inside the housing, the returnable box comprises protrusion parts protruding outward in a width direction and configured to slide on the pair of support members, and the first and second recessed parts are disposed in one of upper and lower surfaces of the projecting part, and the one of the upper and lower surfaces and the projecting part of the locking mechanism slide on each other.

7. The delivery shelf system according to claim 6, wherein at both ends of each of the protrusion parts in a sliding direction, one of the upper and lower surfaces thereof is inclined from a horizontal surface so as to get closer to the other of the upper and lower surfaces thereof, and a thickness of each of the protrusion parts is reduced toward both ends of that protrusion part in the sliding direction.

8. A method for controlling a delivery shelf system,
the delivery shelf system comprising:

a shelf extending from an exterior of a building to an interior thereof, and a returnable box configured to be stored and slidably supported in the shelf, wherein upon the returnable box being delivered, it can be pushed from outside the building into the shelf, and the returnable box stored in the shelf can be pulled out from the shelf from inside the building, and wherein a first recessed part is provided in an indoor-side end part of the returnable box and a second recessed part is provided in an outdoor-side end part thereof, the indoor-side end part being an end part of the returnable box that is positioned on an indoor side when the returnable box is stored in the shelf, and the outdoor-side end part being an end part of the returnable box that is positioned on an outdoor side when the returnable box is stored in the shelf, a locking mechanism including a projecting part is provided at the indoor-side end part of the shelf, the projecting part being configured to be pressed and inserted into the first recessed part or into the second recessed part, the projecting part is inserted into the first recessed part while the returnable box is stored in the shelf, so that the returnable box is locked to the shelf, when the projecting part is retracted from the first recessed part by releasing the locking and the returnable box is pulled out from the shelf into inside the building, the projecting part is inserted into the second recessed part and the pulled-out returnable box is thereby stopped, and the second recessed part is inclined with respect to an upper surface of the returnable box toward an indoor side.

* * * * *